United States Patent
Griffiths

(10) Patent No.: US 7,210,695 B2
(45) Date of Patent: May 1, 2007

(54) SUSPENSION SYSTEMS

(76) Inventor: Adrian Michael Griffiths, Water Side, Preston Bagot, Henley-in-Arden, Warwickshire B95 5ED (GB)

(*) Notice: Subject to any disclaimer, the term of this patent is extended or adjusted under 35 U.S.C. 154(b) by 0 days.

(21) Appl. No.: 10/535,580

(22) PCT Filed: Nov. 21, 2003

(86) PCT No.: PCT/GB03/05078

§ 371 (c)(1),
(2), (4) Date: May 19, 2005

(87) PCT Pub. No.: WO2004/045940

PCT Pub. Date: Jun. 3, 2004

(65) Prior Publication Data
US 2006/0071444 A1   Apr. 6, 2006

(30) Foreign Application Priority Data

| Nov. 21, 2002 | (GB) | ................................. 0227191.4 |
| Nov. 21, 2002 | (GB) | ................................. 0227193.0 |
| Sep. 9, 2003 | (GB) | ................................. 0320995.4 |
| Sep. 20, 2003 | (GB) | ................................. 0322096.9 |

(51) Int. Cl.
*B62K 21/00* (2006.01)
*B62K 9/00* (2006.01)

(52) U.S. Cl. ....................... 280/283; 280/275
(58) Field of Classification Search ................ 180/227; 280/288, 284, 283, 275, 276
See application file for complete search history.

(56) References Cited

U.S. PATENT DOCUMENTS

| 3,983,770 A * | 10/1976 | Skrentner et al. .............. 82/19 |
| 4,789,174 A * | 12/1988 | Lawwill ...................... 280/284 |
| 5,299,820 A * | 4/1994 | Lawwill ...................... 280/277 |
| 5,354,085 A * | 10/1994 | Gally ......................... 280/285 |
| 5,431,426 A * | 7/1995 | Ijams et al. .................. 280/276 |
| 5,498,013 A | 3/1996 | Hwang |
| 5,772,228 A * | 6/1998 | Owyang ...................... 280/284 |
| 6,086,080 A * | 7/2000 | Scheffer ...................... 280/283 |
| 6,896,276 B1 * | 5/2005 | Sparrow ...................... 280/276 |
| 6,910,702 B1 * | 6/2005 | Hals .......................... 280/286 |

FOREIGN PATENT DOCUMENTS

| DE | 461 731 C | 6/1928 |
| DE | 197 26 067 A | 12/1998 |
| DE | 202 02 656 U | 5/2002 |
| EP | 1 241 087 A | 9/2002 |
| WO | WO 00/05128 A | 2/2000 |

* cited by examiner

*Primary Examiner*—Tony Winner
(74) *Attorney, Agent, or Firm*—Davis Bujold & Daniels, P.L.L.C.

(57) ABSTRACT

A suspension system for a vehicle with a chain driven rear wheel includes: a rear suspension assembly and chain driven transmission arrangement that offers very high levels of anti-brake lift and anti-squat and does so consistently through a large range of rear suspension movement; a front suspension assembly/steering system with a steering axis inclined in the side view at an angle of castor which intersects the ground in front of the center of the contact patch, the front suspension assembly having a high degree of anti-brake dive; the front and rear suspension assemblies being interconnected in such a way as to offer low resistance to anti-phase motion and higher resistance to in-phase motion.

22 Claims, 17 Drawing Sheets

SUSPENSION SYSTEMS

The present invention relates to suspension systems and in particular suspension systems for two wheeled vehicles, that is bicycles and motorcycles.

In the following specification the following terms shall be taken to mean:

Anti-brake dive; A property of the front suspension which describes its ability to prevent deflection when the brakes are applied by reacting force through its linkages rather than its springs.

Anti-brake lift; A property of the rear suspension, which describes its ability to prevent deflection when the brakes are applied by reacting force through its linkages rather than its springs.

Anti-brake lift angle; The angle subtended, in the side view, by the line joining the tyre contact patch centre with the point at which the brake load is reacted to the vehicle frame, to the horizontal. The greater this angle, the higher the anti-brake lift.

Anti-phase motion; When the front and rear wheels both move vertically but in opposite directions.

Anti-squat; A property of the rear suspension, which describes its ability to prevent suspension movement when a tractive load is applied by reacting force through its linkages rather than its springs.

Anti-squat angle; The angle subtended, in the side view, by the line joining the tyre contact patch centre to the point of intersection of the chain and the line joining the centre of the rear wheel with the point at which rear suspension loads are transmitted via the linkages to the frame.

Castor angle; The angle to the vertical, in the side view, that the steering axis makes with the ground (see FIG. 1a).

Castor trail; The horizontal distance from the wheel centre to the point where the steering axis intersects with the ground in the side view.

Contact patch trajectory; The path of the contact patch centre, as seen from the side view, as the suspension articulates from rebound to bump. This characteristic is closely associated with anti-brake dive (for front suspensions) and anti-brake lift (for rear suspensions), if the brakes are mounted directly to the part carrying the wheel hub. If the brakes are mounted independently, the contact patch trajectory may be decoupled from anti-brake lift and dive.

Contact patch trajectory angle; The angle to the horizontal of the contact patch trajectory.

In-phase motion; When the front and rear wheels both move vertically and in the same direction.

Coupling; When one parameter influences another, the parameters are said to be coupled.

Interconnection; A means of connecting the front and rear suspensions in such a way that vertical motion of one influences vertical motion of the other.

Sinkage; The deflection in the vertical direction of the rider and frame (sprung mass) due to the rider's own weight.

Wheel centre trajectory; The path of the wheel centre, as seen from the side view, as the suspension articulates from rebound to bump (see FIG. 1b). This characteristic is closely associated with anti-squat.

Wheel centre trajectory angle; The angle to the horizontal of the wheel centre trajectory (see FIG. 1b).

Although bicycles incorporating suspensions have existed almost as long as have bicycles, the 'art' of suspension design has been driven mostly by other modes of transport for example, cars, motorcycles etc. The relatively recent increase in popularity of bicycles designed for off-road use has raised the level of interest in suspensions for bicycles.

However, some of the design considerations that are unique to bicycles have prevented some of the developments made in the broader field from translating entirely successfully to bicycles.

Namely:

a) The flexibility of the suspension must be limited to keep sinkage to an acceptable level. This is due to the need to maintain ground clearance (pedal arc to ground) when riding and to ensure that the saddle is not too high when mounting.

b) Transmission of power whilst the rider is in the seated position is difficult when traversing uneven terrain. The smooth delivery of torque to the pedals is more difficult and more fatiguing when the weight of the rider is born by his/her legs as opposed being supported by the saddle.

c) Bracing of arms to the handlebars is difficult when traversing uneven terrain due to the shock loads, which are transmitted through them. The natural inclination of the rider under these circumstances is to hold the handlebars relatively loosely, which has the undesirable knock on effect of transferring weight otherwise born by the arms to the saddle, which in turn heightens discomfort.

d) Actuation of the suspension when the transmission torque is uneven (such as when going uphill) tends to sap energy. Most designs exhibit low levels of anti-squat leading to cyclic deflection of the suspension as the transmission torque fluctuates. The energy associated with these cyclic deflections is dissipated mostly in the suspension dampers and is lost. For the same reason the flexibility of the rear suspension is practically limited by a need to avoid excitation of the primary resonant frequency by cyclic torque fluctuations, typically in the region of 120 to 200 cycles per minute (corresponding to crank rotational frequency of 60 to 100 cycles per minute i.e. one torque peak per leg per cycle).

e) The requirement for stiff tyres (to keep rolling resistance low) puts greater longitudinal shock loads into the wheel and frame/rider and hence heightens the demand on the suspension to compensate for this harshness.

It is mostly in respect of these bicycle specific issues that the invention relates although significant advantages may be gained by its application to motorcycles or any other vehicles with chain driven rear wheels.

Bicycle suspensions used hitherto include high anti-brake lift/anti-squat suspensions for the rear wheel, see for example FIGS. 2a to 2c.

The trailing arm design shown in FIG. 2a is widely used and has a moderate amount of anti-squat and anti-brake lift. The trailing arm pivot 16 is arranged to be coincident with the point at which the chain 18 first touches the drive sprocket wheel 20. This removes any interference or coupling between the transmission and suspension travel. The anti-brake lift angle is not affected by gear selection at the rear wheel. The wheel centre trajectory is fairly vertical which tends not to be so good for absorbing sharp longitudinal inputs.

The trailing arm design shown in FIG. 2b exhibits very high anti-squat and anti-brake lift. The transmission and the suspension are perfectly de-coupled by virtue of the transmission being mounted entirely on the rear triangle. The wheel centre trajectory is around 45 degrees upwards/rearwards which is good for bump absorption. The weakest feature of this design is the lack of de-coupling between the suspension and the riders feet and legs since clearly movement of the rear wheel 10 results in longitudinal displacement of the pedals and cranks.

The design shown in FIG. 2c has the brakes mounted onto a part that is itself connected via a bearing to the trailing arm 12 or hub 34. This allows the anti-brake angle and the anti-squat angle to be controlled independently. In this case the high level of anti-brake lift was used to counter the inevitable pitching that would otherwise have occurred by tuning the suspension to have low stiffness for comfort reasons.

FIG. 3a shows a front suspension in which the wheel hub 34 is attached to the front forks 70 by a leading arm part. The braking couple is reacted through the leading arm.

Figure 3A:
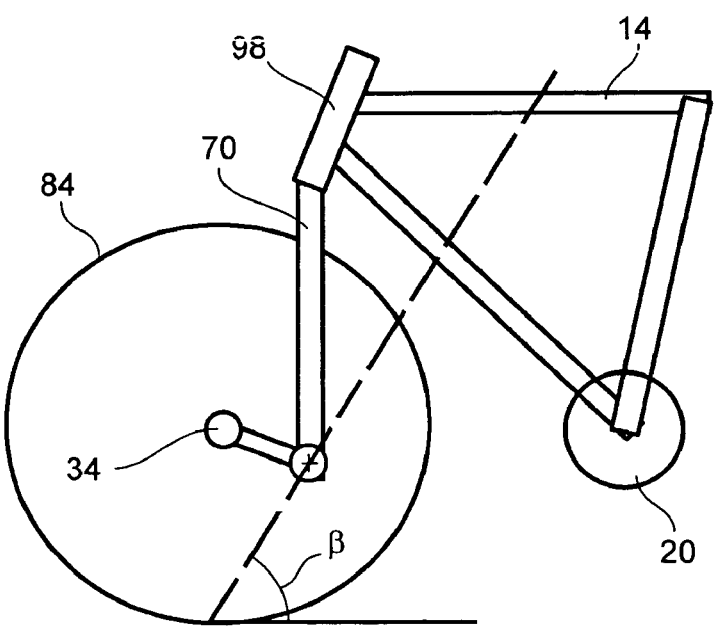
FIGS. 3a to 3d show suspension systems used hitherto on the front wheels of bicycle/motorcycles.
Figure 3B:
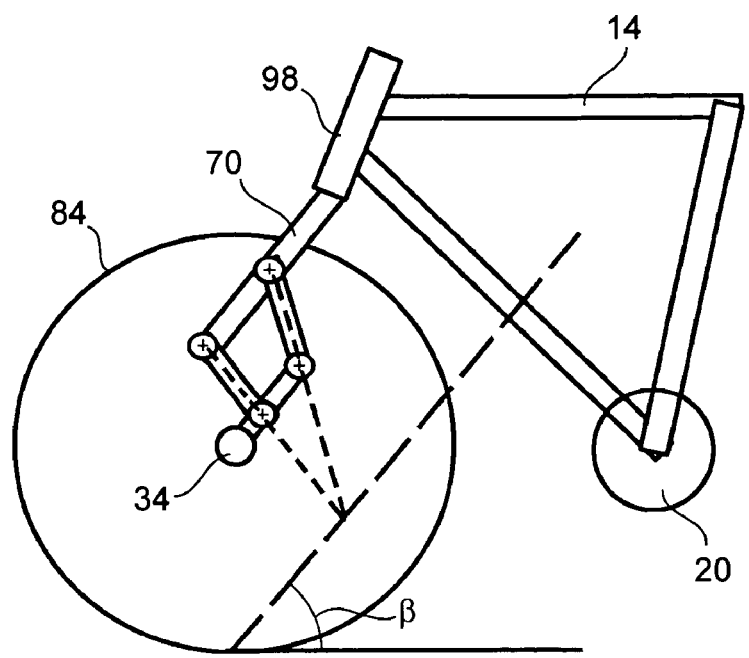

FIG. 3b shows a front suspension in which the wheel hub 34 is attached to a link that is in turn attached via two links to the front forks 70. The two links converge away from the forks 70, extensions of the links intersecting at a point which describes a virtual centre about which the wheel hub 34 rotates instantaneously. The braking couple is reacted through the link to which the wheel hub 34 is attached.

Figure 3C:
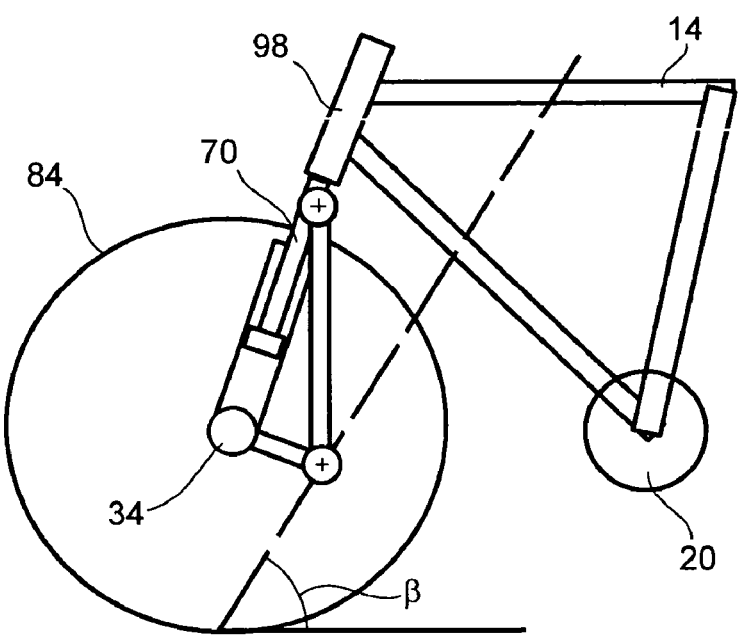

FIG. 3c shows a front suspension in which the wheel hub 34 is attached to the end of a telescopic fork 70 and is constrained to move in a direction parallel to its axis of sliding. The brake couple is transmitted to a link via a brake reaction lever that is itself connected to the wheel hub 34 via a bearing concentric with the wheel bearing.

Figure 3D:
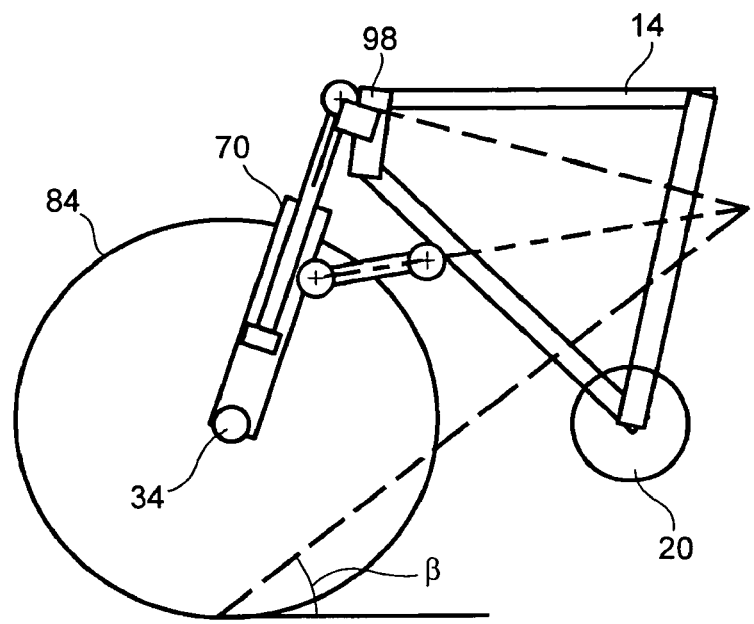

FIG. 3d shows a front suspension in which the wheel hub 34 is attached to a telescopic fork 70, the fork 70 being located to the frame 14 via a lower wishbone and a spherical upper joint. The handlebars are connected directly to the upper part of the fork 70 so that steering movement of the handlebars will be transmitted to the fork 70. The intersection of the lower wishbone axis, in the side view, and a line drawn perpendicular to the fork sliding axis through the upper spherical joint, defines the virtual centre of the wheel hub 34. The braking couple is reacted through the fork 70.

In the suspensions shown in FIGS. 3a, 3b and 3d the wheel centre rotates about either an actual pivot as in FIG. 3a or a virtual pivot as in FIGS. 3b and 3d. This rotation point (or instantaneous rotation point in the case of those virtually defined) defines the line along which the braking forces are transmitted to the frame i.e. the anti-brake dive angle. In these cases the trajectory of the wheel centre is linked to the angle of anti-brake dive because factors that govern one will also govern the other.

The suspension shown in FIGS. 3c differs from the others in that the part through which the braking couple is reacted (the brake reaction lever) is itself connected to the wheel hub 34 via a bearing that is concentric with the wheel bearing. This breaks the dependency of anti-brake dive on the wheel centre trajectory and vice versa. For this arrangement, the wheel centre trajectory is upwards/rearwards along the axis of the fork 70 whilst the intersection of link axis and a line perpendicular to the fork axis through the connection between the brake reaction lever and link, defines the anti-dive angle.

The combination of a front suspension with a high degree of anti-brake dive and rear suspension with high anti-brake lift and anti-squat will enable lower stiffness to be achieved in pitch. However with conventional suspension systems, the stiffness in pitch (anti-phase motion) must be compromised in order to achieve sufficient stiffness for in-phase motion, in order to avoid excessive lowering of the suspension due to the weight of the rider, which may, for example, cause problems with ground clearance, particularly pedal clearance when cornering. For anti-phase motion a relatively soft suspension is desirable, in order to isolate the rider from shocks.

The present invention provides a suspension system having; a front suspension assembly with a high degree of anti-brake dive and a rear suspension assembly with high anti-brake lift and anti-squat, the suspension being relatively stiff for in-phase motion and relatively soft for anti-phase motion.

According to one aspect of the present invention a suspension system for a vehicle with a chain driven rear wheel comprises;
  i) a rear suspension and chain driven transmission arrangement that offers very high levels of anti-brake lift and anti-squat and does so consistently through a large range of rear suspension movement;
  ii) a front suspension/steering system with a steering axis inclined in the side view at an angle of castor which intersects the ground in front of the centre of the contact patch, the front suspension having a high degree of anti-brake dive; characterised in that
  iii) the front and rear suspension assemblies are interconnected in such a way as to offer low resistance to anti-phase motion and higher resistance to in-phase motion.

Figure 1B:
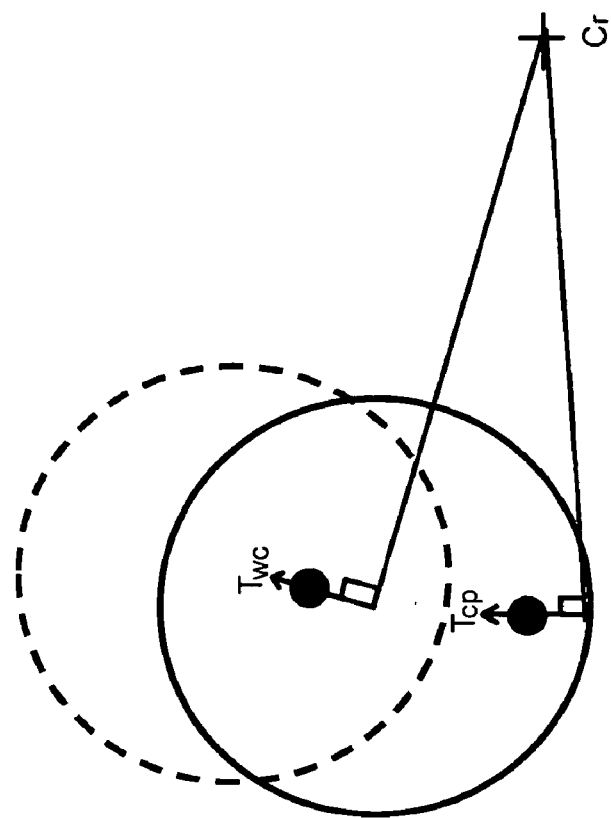
Figure 1A:
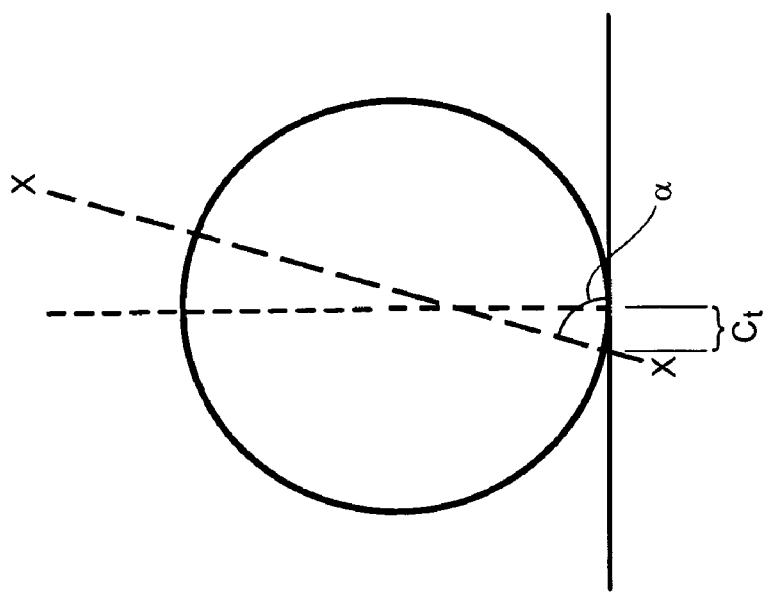
Figure 2A:
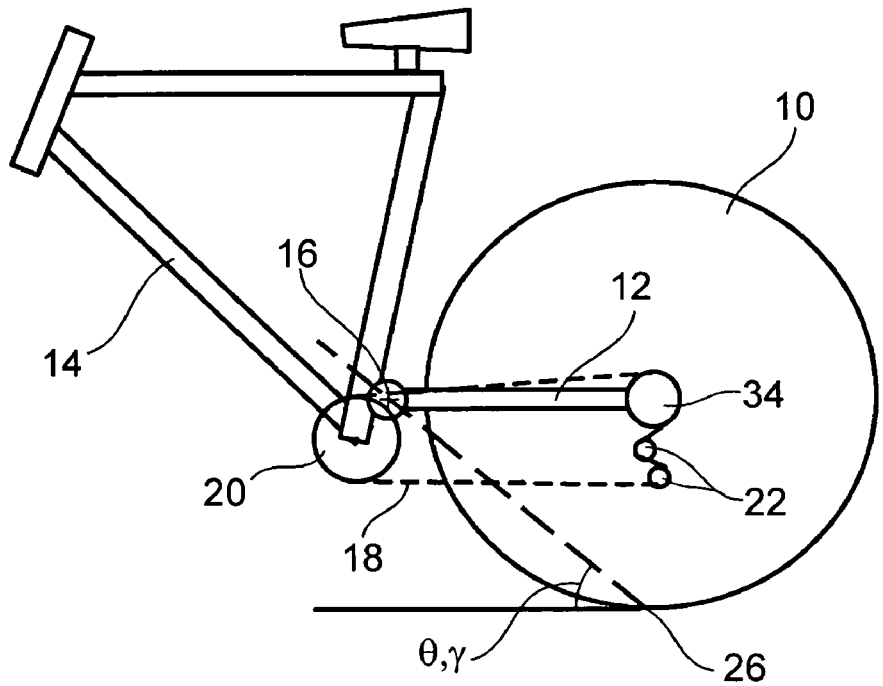
Figure 2B:
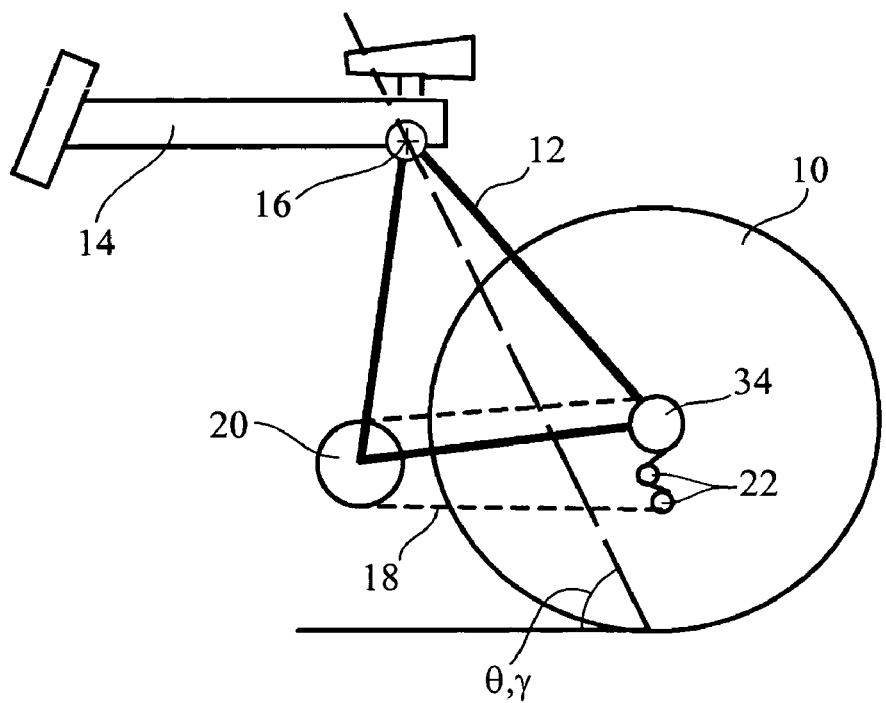
Figure 2C:
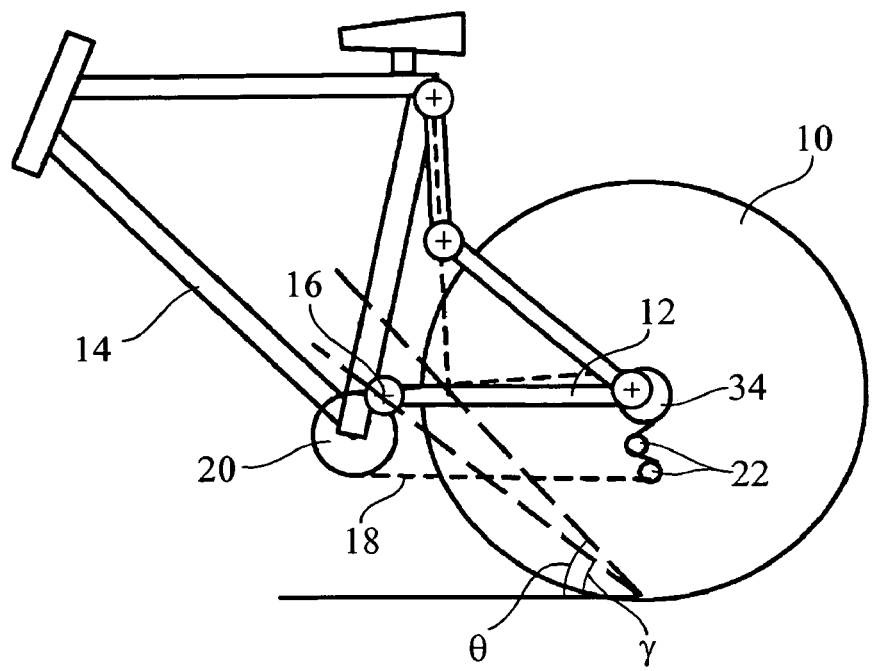
Figure 4:
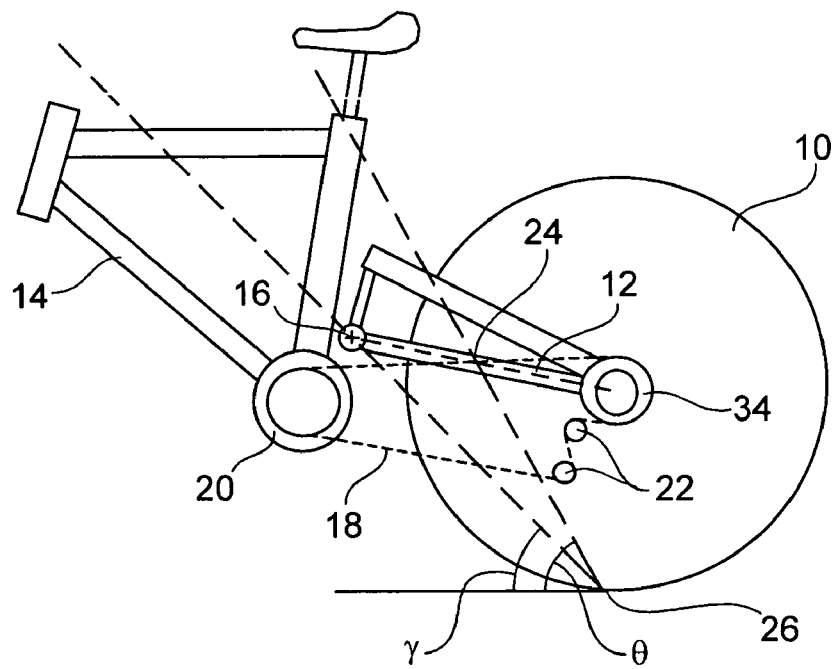
Figure 5:
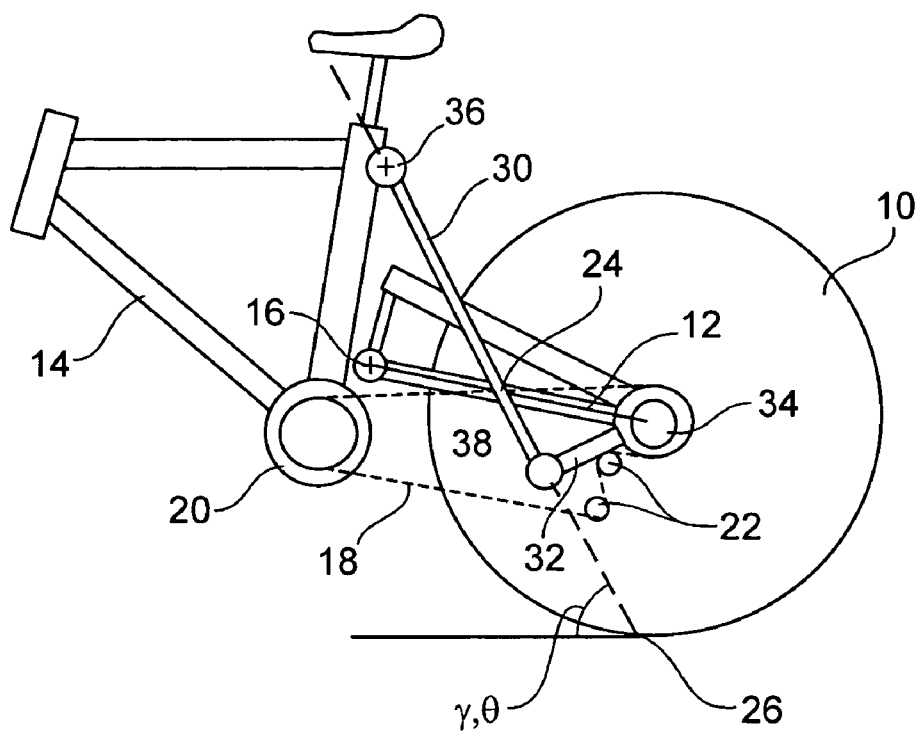
Figure 6:
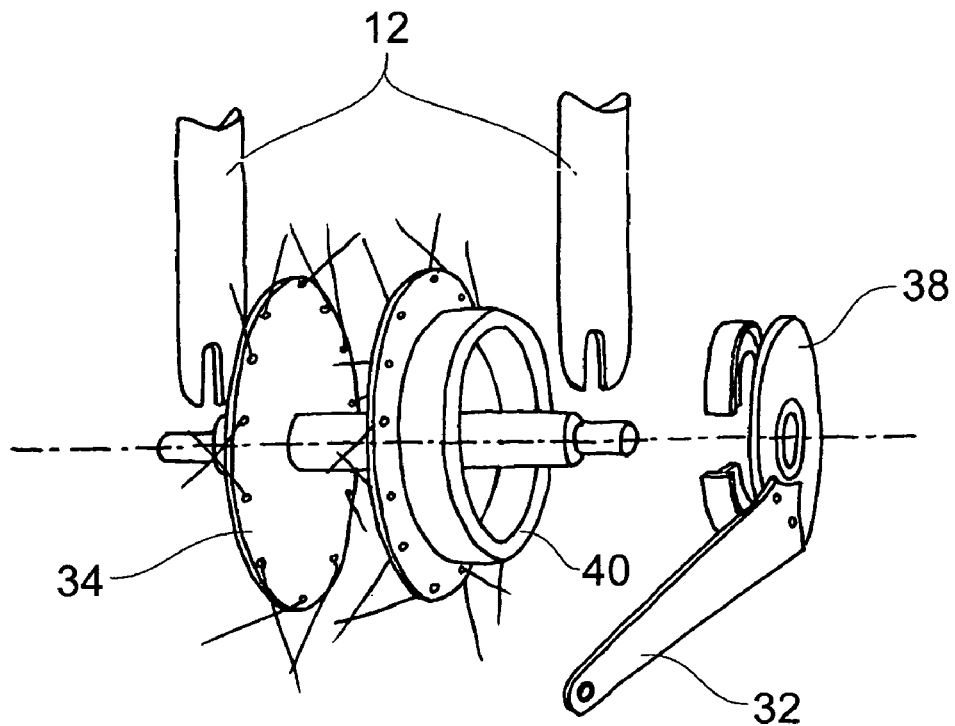
Figure 7:
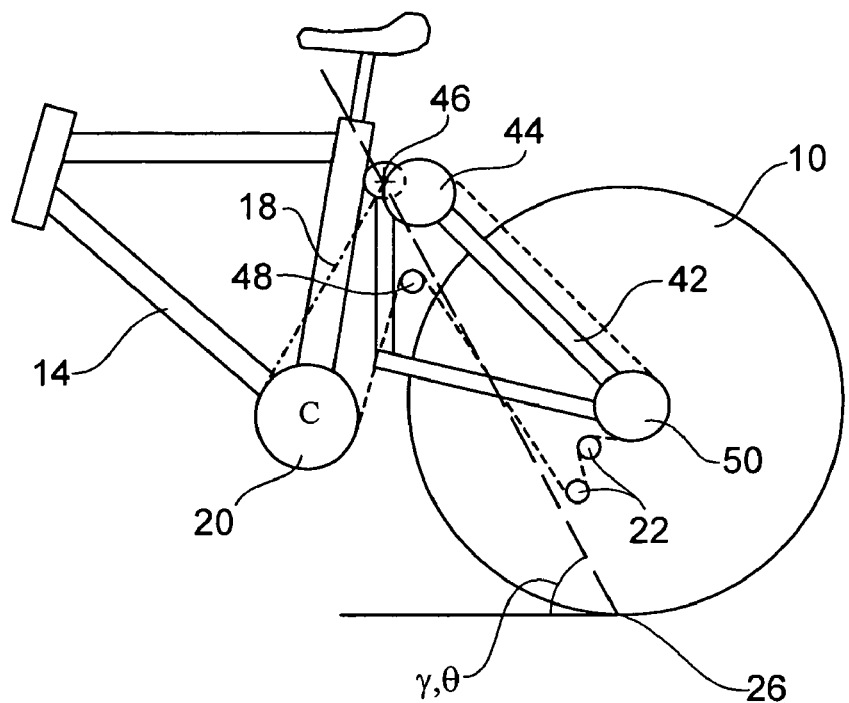
Figure 8:
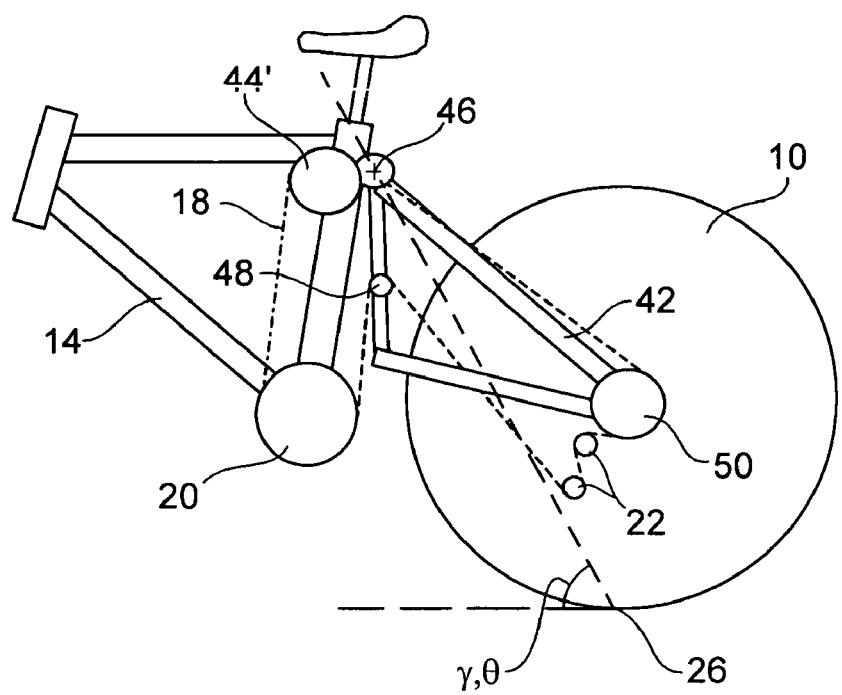
Figure 9:
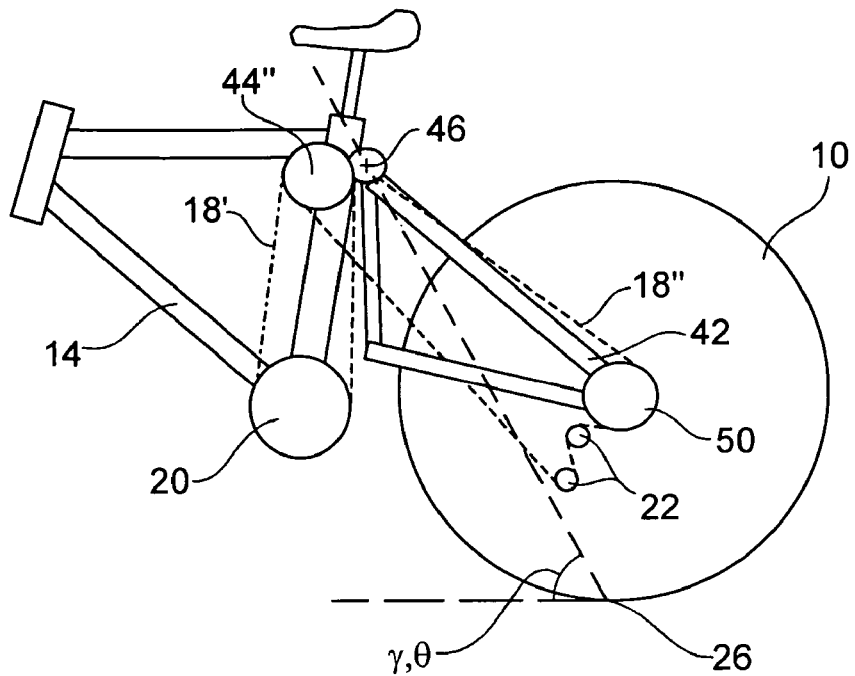
Figure 10:
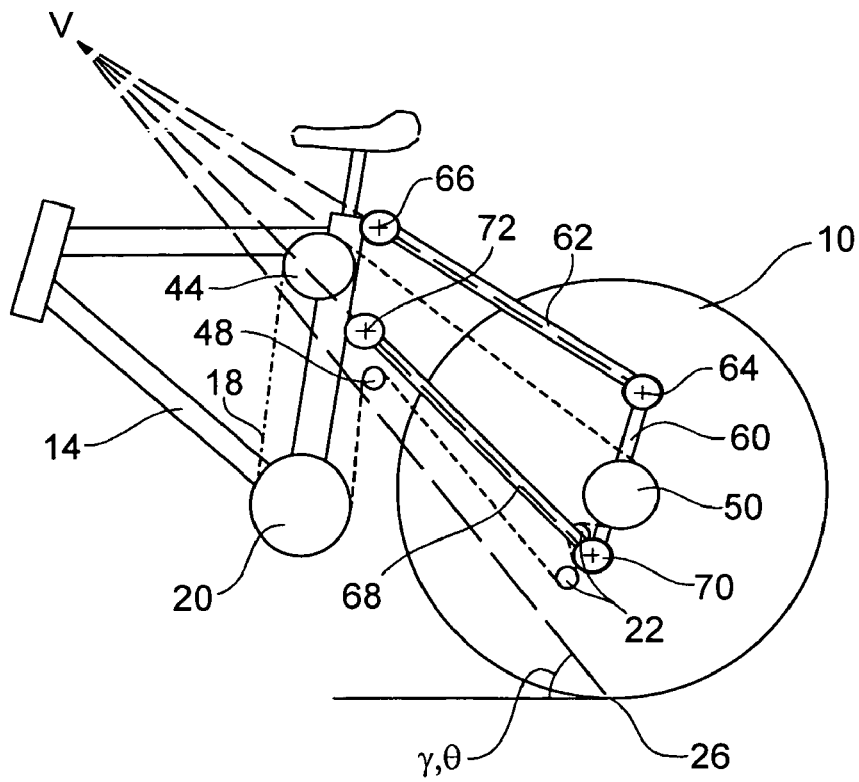
Figure 11:
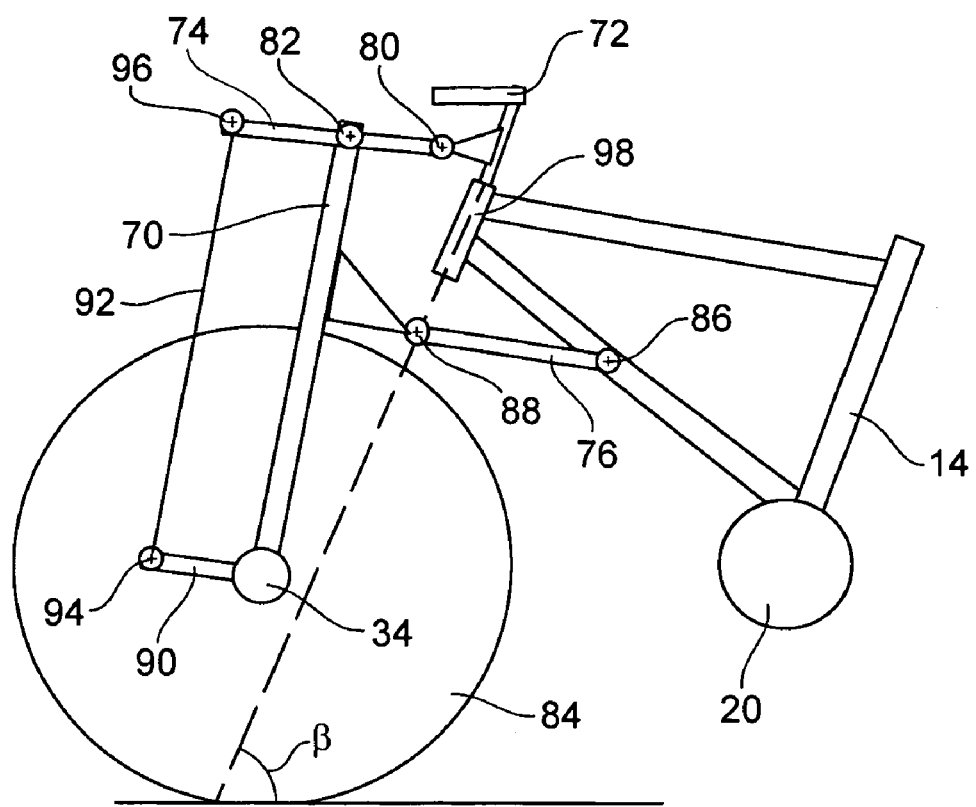
Figure 12:
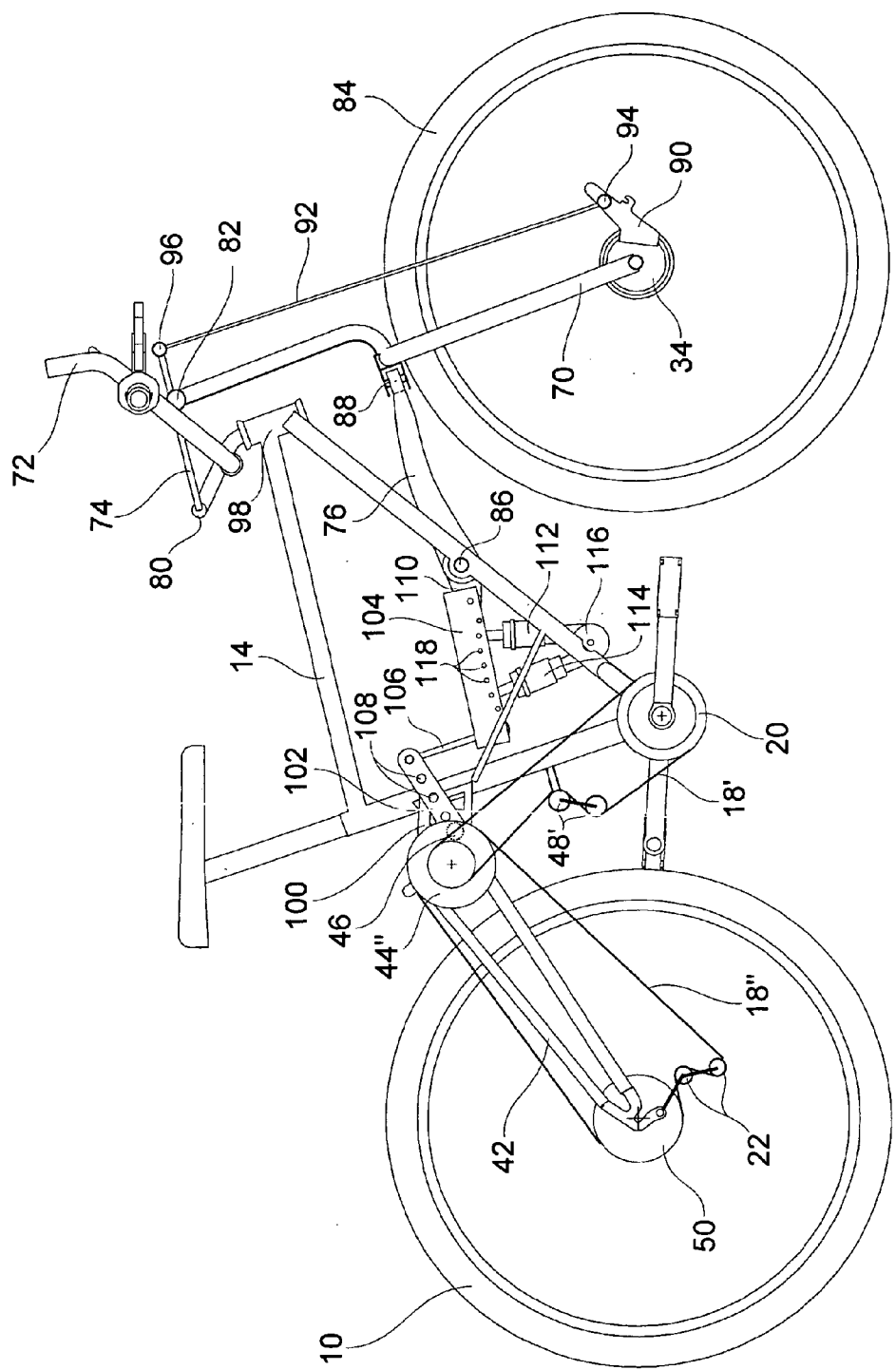
Figure 13:
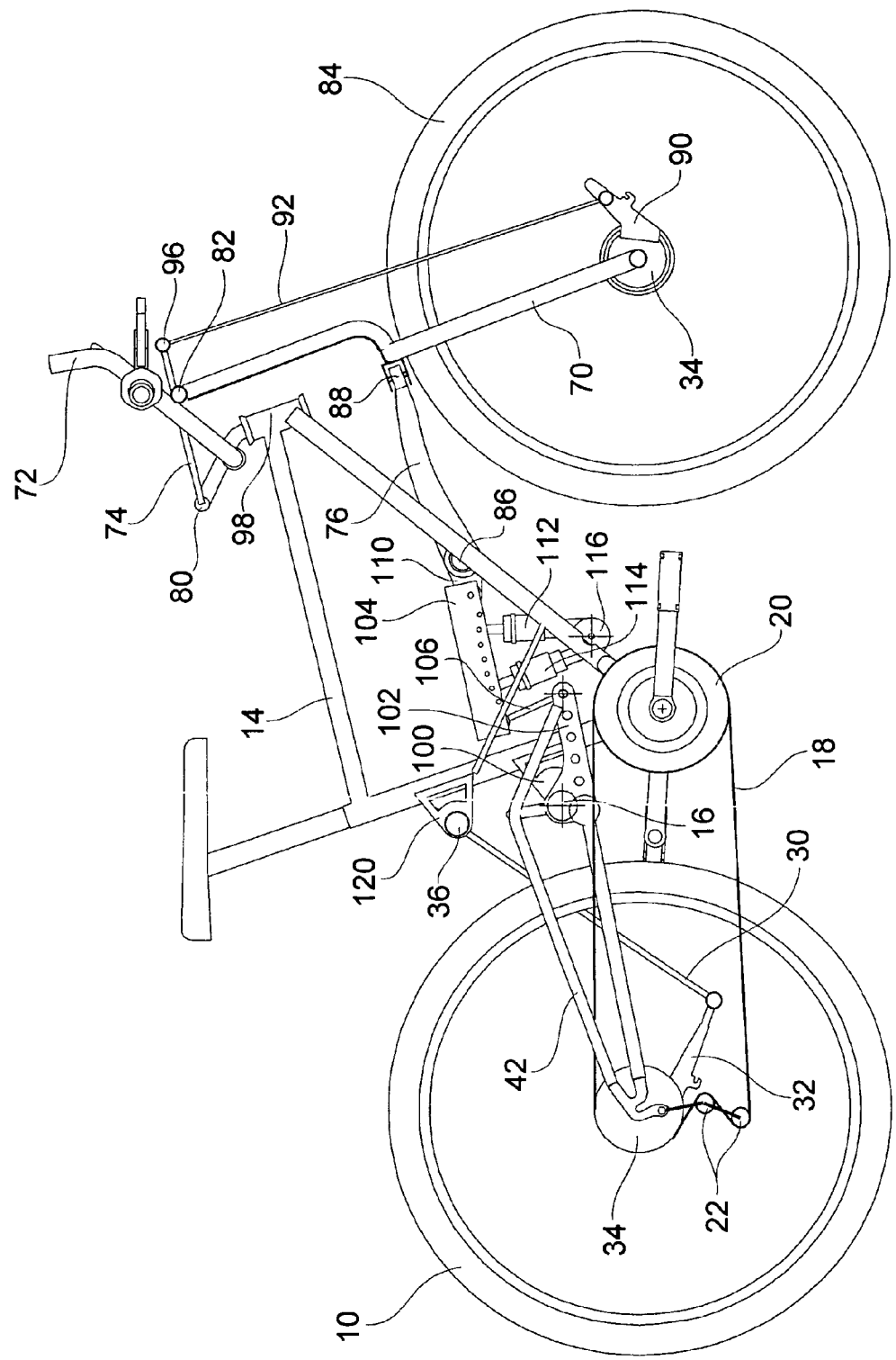
Figure 14:
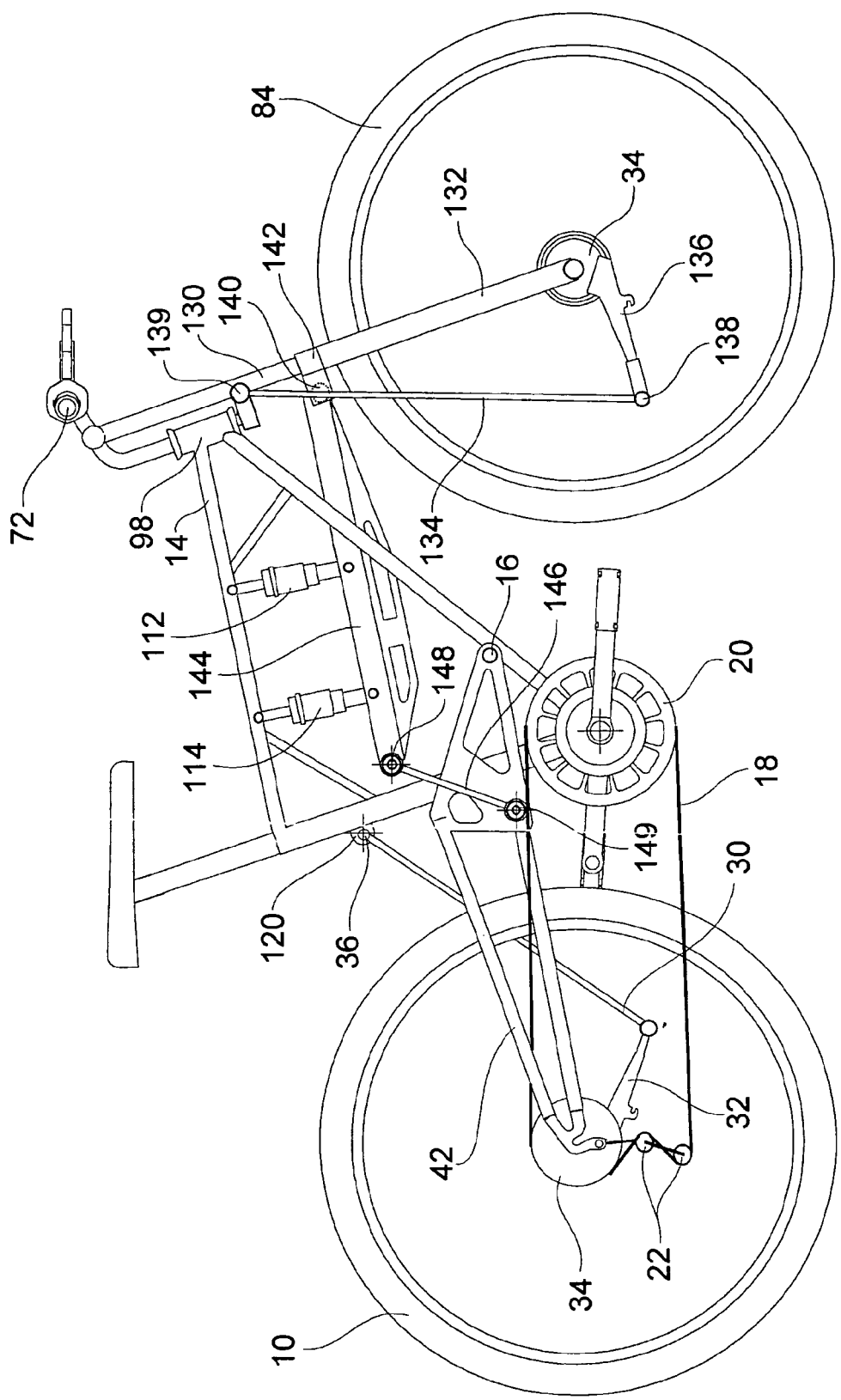
Figure 15:
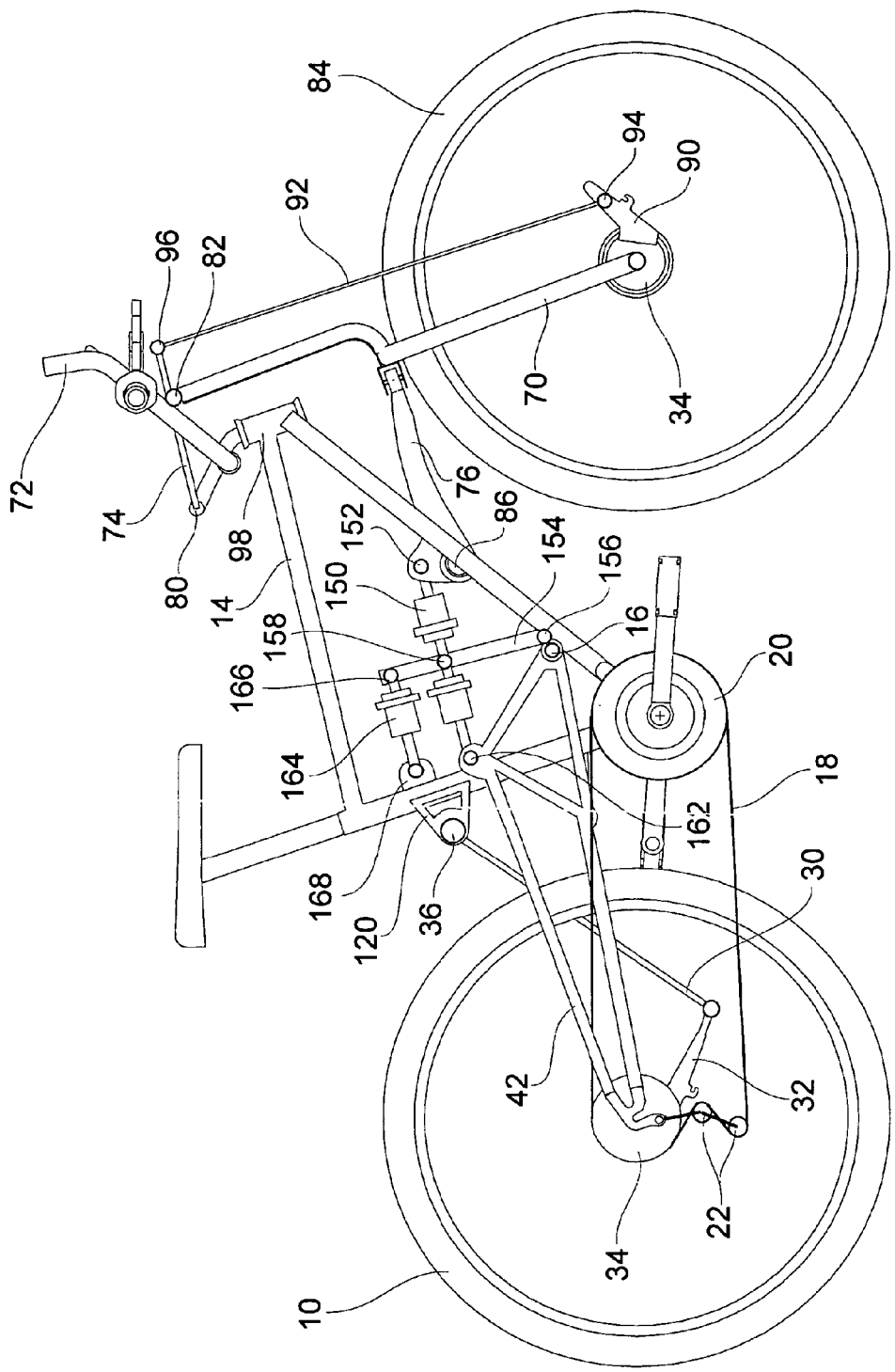
Figure 16:
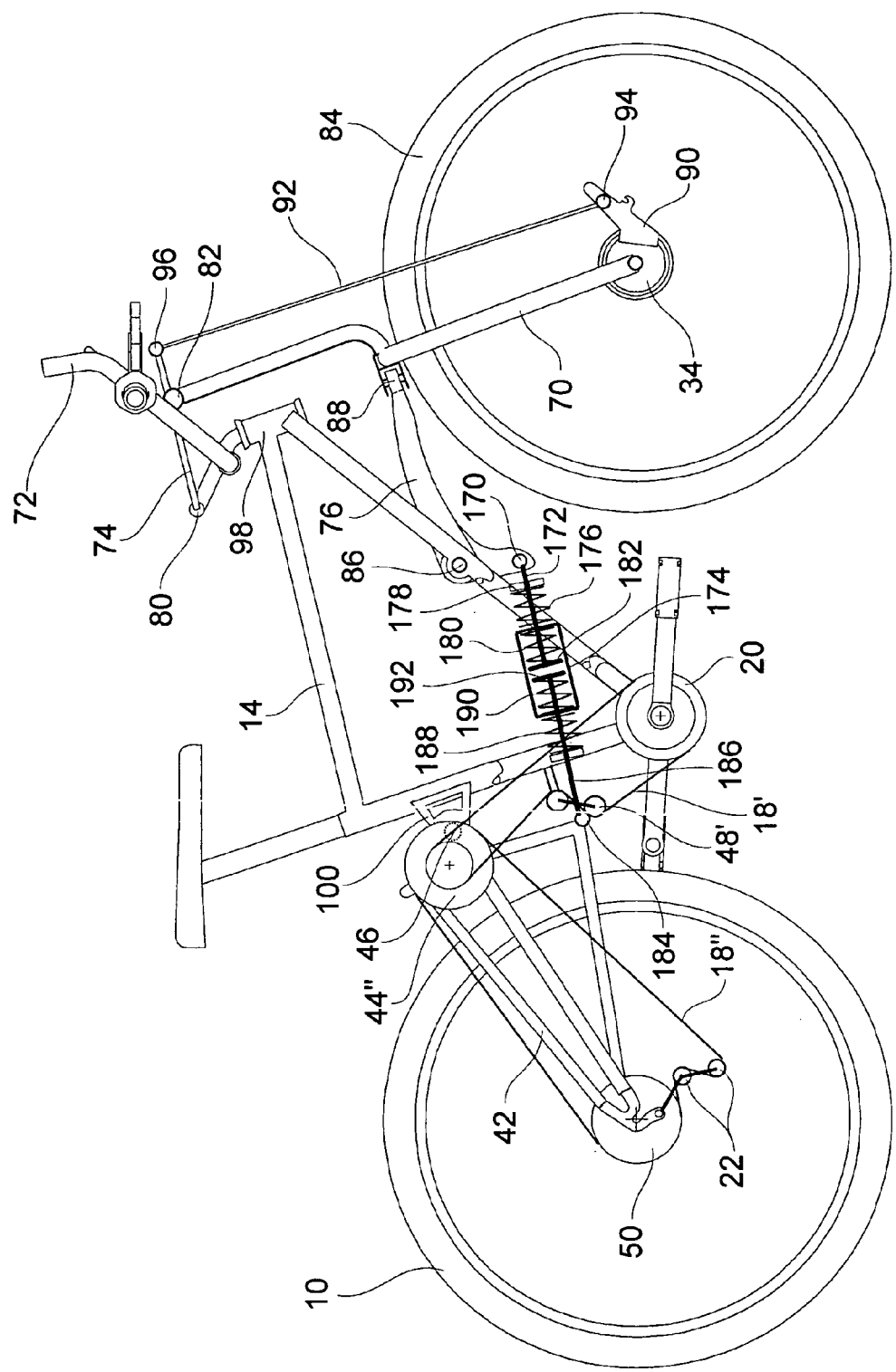
Figure 17:
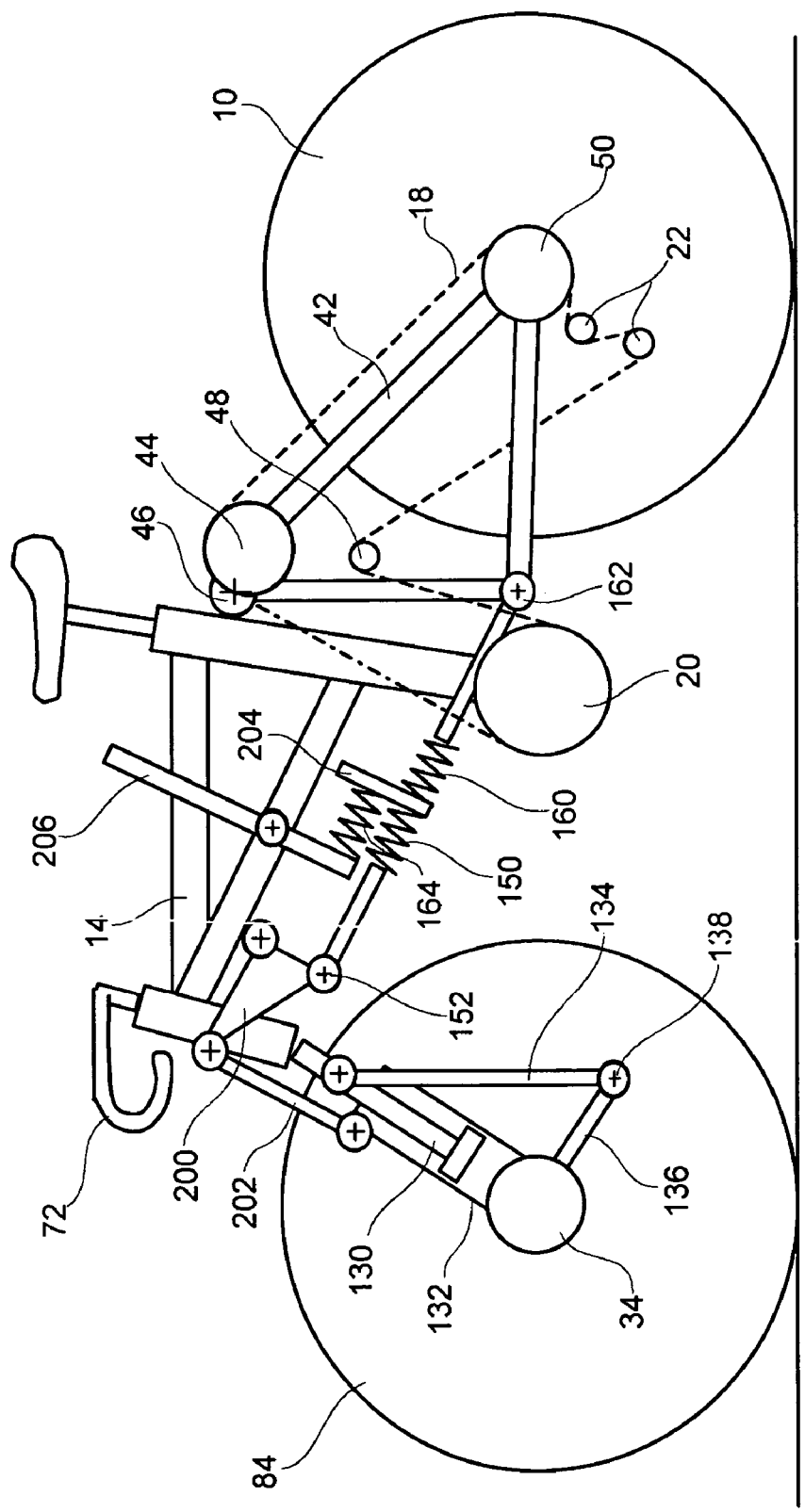
Figure 18:
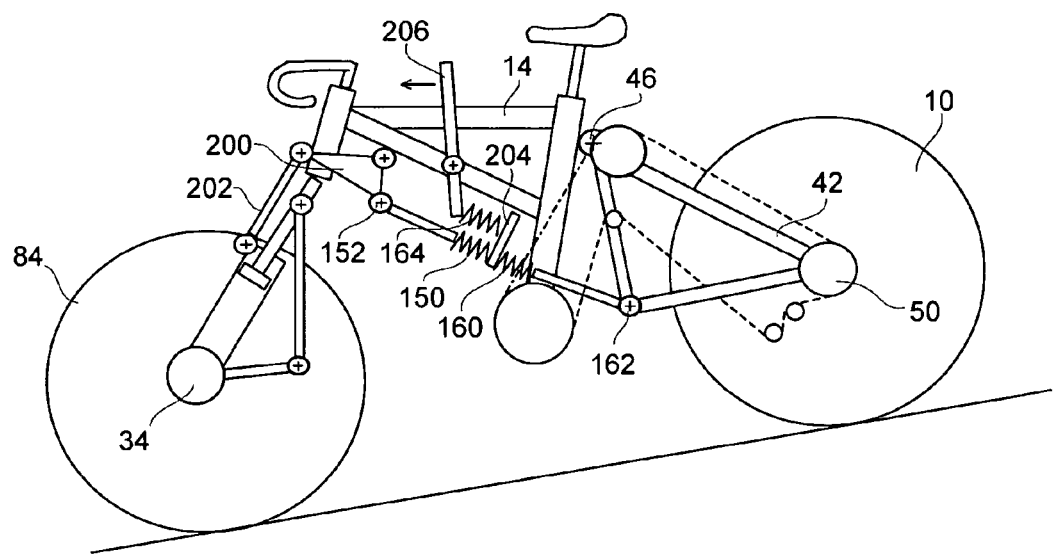
Figure 19:
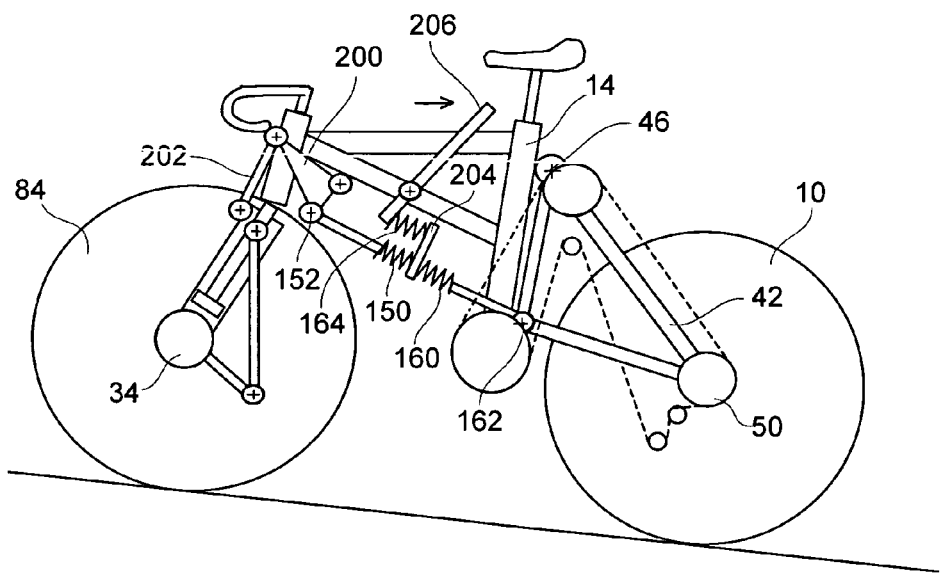
Figure 20:
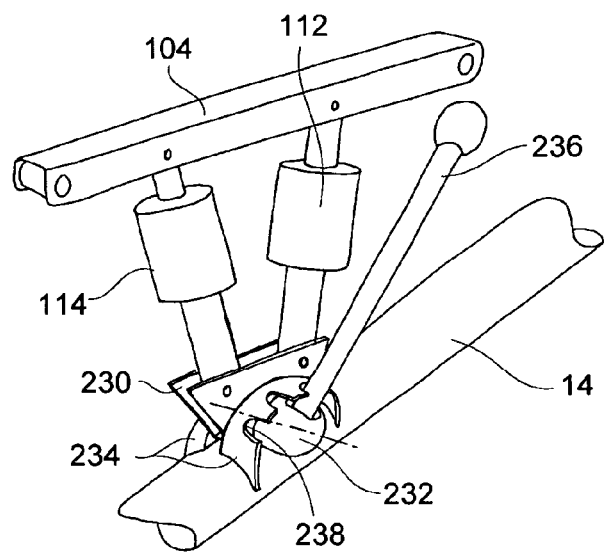
Figure 21:
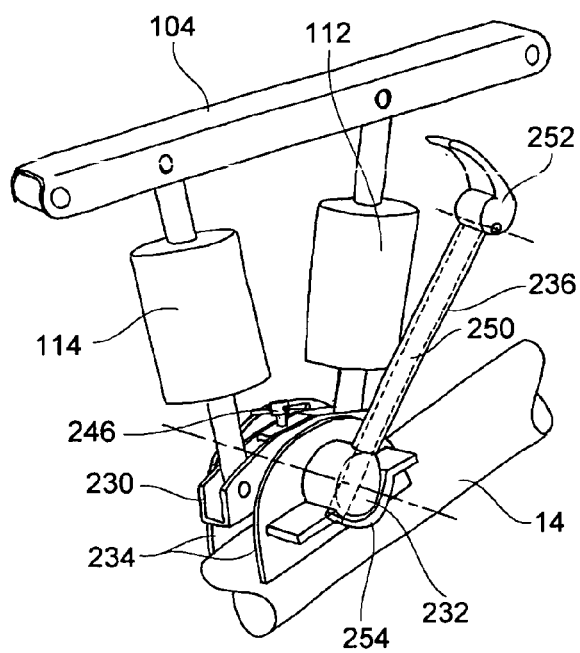
Figure 22:
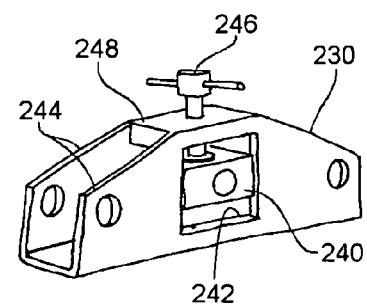

The invention is now described, by way of example only, with reference to the accompanying drawings, in which:

FIG. 1a is a diagrammatic view of bicycle wheel, showing the steering axis X—X; caster angle a; and caster trail $C_t$;

FIG. 1b is a diagrammatic view of bicycle wheel in bump, showing the wheel centre trajectory $T_{wc}$; and contact patch trajectory $T_{cp}$;

FIG. 2a is a diagrammatic illustration of one form or rear suspension assembly used on bicycles hitherto;

FIG. 2b is a diagrammatic illustration of a second form or rear suspension assembly used on bicycles hitherto;

FIG. 2c is a diagrammatic illustration of a third form or rear suspension assembly used on bicycles hitherto;

FIG. 3a is a diagrammatic illustration of one form or front suspension assembly used on bicycles hitherto;

FIG. 3b is a diagrammatic illustration of a second form or front suspension assembly used on bicycles hitherto;

FIG. 3c is a diagrammatic illustration of a third form or front suspension assembly used on bicycles hitherto;

FIG. 3d is a diagrammatic illustration of a fourth form or front suspension assembly used on bicycles hitherto;

FIG. 4 is a diagrammatic illustration of a first assembly for the suspension of a rear wheel of a bicycle, with a suspension system in accordance with the present invention;

FIG. 5 is a diagrammatic illustration of a modification to the assembly illustrated in FIG. 4;

FIG. 6 illustrates in exploded perspective view the hub assembly of the assembly illustrated in FIG. 5;

FIG. 7 is a diagrammatic illustration of a second assembly for the suspension of a rear wheel of a bicycle, with a suspension system in accordance with the present invention;

FIG. 8 is a diagrammatic illustration of a modification to the assembly illustrated in FIG. 7;

FIG. 9 is a diagrammatic illustration of a modification to the assembly illustrated in FIG. 8;

FIG. 10 is a diagrammatic illustration of a third assembly for the suspension of a rear wheel of a bicycle, with a suspension system in accordance with the present invention;

FIG. 11 is a diagrammatic illustration of an assembly for the suspension of a front wheel of a bicycle, with a suspension system in accordance with the present invention;

FIG. 12 is a side view of a first embodiment of a suspension system in accordance with the present invention;

FIG. 13 is a side view of a second embodiment of a suspension system in accordance with the present invention;

FIG. 14 is a side view of a third embodiment of a suspension system in accordance with the present invention;

FIG. 15 is a side view of a fourth embodiment of a suspension system in accordance with the present invention;

FIG. 16 is a side view of a fifth embodiment of a suspension system in accordance with the present invention;

FIG. 17 is a diagrammatic illustration of a sixth embodiment of a suspension system in accordance with the present invention, shown in a first position;

FIG. 18 is a diagrammatic illustration of the embodiment illustrated in FIG. 17, shown in a second position;

FIG. 19 is a diagrammatic illustration of the embodiment illustrated in FIG. 17, shown in a third position;

FIG. 20 shows a pitch attitude control mechanism for the suspension systems illustrated in FIGS. 12 and 13;

FIG. 21 shows a modification to the pitch attitude control mechanism shown in FIG. 20; and FIG. 22 shows a detail of the pitch attitude control mechanism shown in FIG. 21.

The assembly for suspension of the rear wheel illustrated in FIG. 4, is based on the known suspension illustrated in FIG. 2a. In the suspension illustrated in FIG. 2a, the rear wheel 10 is mounted on a trailing arm 12 which is pivoted to the bicycle frame 14 about a pivot 16, the axis of which passes through the point at which the chain 18 first touches the drive sprocket wheel 20. With this arrangement the anti-squat angle q and anti-brake lift angle g are equal, being the angle subtended, in the side view, by the line joining the tyre contact patch centre 26 and the axis of pivot 16. As a result, the anti-squat and anti-brake lift will be relatively low.

In accordance with the assembly illustrated in FIG. 4, the pivot 16 of the trailing arm 12, is raised, so that the axis of pivot 16 is above the level of the point at which the chain 18 first touches the drive sprocket wheel 20. As a result, the point 24, at which the chain 18 intersects the line joining the centre of the rear wheel with the axis of pivot 16 is moved rearwards and the anti-squat angle q is increased with corresponding increase in anti-squat. With this configuration, a component of the chain tension acts on the suspension in such a way as to counter the tendency of the bicycle to pitch when a tractive load is applied through the chain 18, this happens as a result of the angle of the chain 18 relative to the line of the trailing arm 12.

Movement of the pivot 16 in this manner will introduce coupling between the transmission and the suspension, the tension in the chain 18 varying on movement of the trailing arm 12. Tensioning means 22, for example the tensioning mechanism of a Derailleur type gear mechanism, is consequently required, in order to maintain appropriate tension in the chain 18.

In the suspension assembly illustrated in FIG. 4, the anti-brake lift angle g and hence anti-brake lift, is not significantly affected by movement of the pivot 16.

As illustrated in FIGS. 5 and 6, the anti-brake lift angle my be increased by introducing a brake reaction link 30, the brake reaction link 30 being pivoted; at one end to a brake reaction lever 32 mounted on the cover plate 38 of a hub mounted drum brake, as illustrated in FIG. 6 and; at the other end to the bicycle frame 14 at a position 36 above the pivot 16. By this means the level of anti-brake lift can be tuned to the desired level. For example, as illustrated in FIG. 5, the brake reaction link 30, in side view, may intersect the point at which the chain 18 intersects the line joining the centre of the rear wheel with the axis of pivot 16, so that the anti-squat angle q and anti-brake lift angle g are equal.

Other forms of hub mounted brake, for example a disc brake in which the brake disk is mounted on the hub and the brake caliper is mounted to the brake reaction lever, may be used in place of the hub mounted drum brake.

The tensioning mechanism 22 of a Derailleur type gear mechanism will only be capable of accommodating a limited degree of coupling between the transmission and the suspension and consequently there is a limit on the amount by which the pivot 16 may be raised. Use of other tensioning means may however overcome this limitation.

In the embodiment illustrated in FIG. 7, the rear wheel 10 is mounted on a trailing arm 42 attached to the frame 14 by pivot 46, high up on the frame 14. An idler sprocket wheel 44 is rotatably mounted on the trailing arm 42, so that the point of first contact of a length of chain 18 from the drive sprocket wheel 20 to the idler sprocket wheel 44, falls on the axis of pivot 46, thereby de-coupling the transmission from the suspension. A tensioner sprocket wheel 48 is provided between the driven sprocket wheel 50 on the wheel 10 and the drive sprocket wheel 20. In this embodiment, the chain 18 on the tension side (i.e. between the idler sprocket wheel 44 and the driven sprocket wheel 50) has a significantly higher than normal side view angle (the angle relative to the horizontal) preferably, though not essentially, of the order of 25 to 50 degrees.

With this assembly the anti-squat angle q and anti-brake lift angle g are equal, both being defined by the line joining the tyre contact patch centre 26 and the axis of pivot 46.

In the modification illustrated in FIG. 8, the idler sprocket wheel 44' is mounted on the frame 14 so that, in side view, the chain 18 between idler sprocket wheel 44' and driven sprocket wheel 50 intersects the axis of pivot 46, thereby preserving the de-coupling of the transmission from the suspension.

In the embodiment illustrated in FIG. 9, a double idler sprocket wheel 44" may be rotatably mounted on the frame 14, separate chains 18' and 18" being provided between the drive sprocket wheel 20 and idler sprocket wheel 44" and between the idler sprocket wheel 44" and driven sprocket wheel 50, respectively. This assembly avoids the need for the tensioner sprocket wheel 48. The two chains 18', 18" may be located on opposite sides of the bicycle, a first idler sprocket wheel 44" located on one side and driving a second idler sprocket wheel 44" by means of an interconnecting shaft.

Alternatively in this embodiment, torque may be transmitted from the pedal crank to an idler gear by other forms of transmission, for example bevel gears and drive shafts or hydraulic means.

In the embodiment illustrated in FIG. 10, the wheel 10 is mounted on a hub carrier 60. A first link 62 is pivotally connected at one end to an upper end 64 of the hub carrier 60 and to the frame 14 by pivot 66. A second link 68 is pivotally connected at one end to a lower end 70 of the hub carrier 60 and to the frame 14 by pivot 72, pivot 72 being spaced below pivot 66. The links 62,68 converge, away from the hub carrier 60, so that the axes thereof intersect at a point V, on the opposite side of pivots 66,72 to the hub carrier 60. The idler sprocket wheel 44' is positioned such that the length of chain 18 between the idler sprocket wheel 44' and driven sprocket wheel 50 will lie on a line, the extension of which will intersect point V. The transmission is thereby de-coupled from the suspension and the anti-squat angle q and anti-brake lift angle g are equal, both being defined by the line joining the tyre contact patch centre 26 and the point V.

While in the embodiments illustrated in FIGS. 7 to 10, Derailleur type gear mechanisms are shown, it will be appreciated that other types of gear mechanism, such as hub gears, may be used. The embodiments illustrated in FIGS. 4 to 6, may also be adapted, by use of independent tensioning means, for use with other types of gear mechanism.

In the above examples of rear suspension assemblies, it is anticipated that the suspension would have significantly lower than normal stiffness (especially in the pitch direction), one that could be expected to utilise a large amount of its available travel, accordingly the properties of anti-squat, anti-lift etc. are required to be as insensitive as possible to suspension travel. To this end, it is foreseen that the length of this portion of chain will be approximately equal to the wheel radius in length or longer. This will correspond to the length of suspension link or links that will be required to achieve this particular aim.

Where the transmission is de-coupled from the suspension, as in the assemblies illustrated in FIGS. 7 to 10, a change of gear will not result in any interference between transmission and suspension.

While all four of the front suspension assemblies illustrated in FIGS. 3a to 3d may be used in a suspension system according to the present invention to provide the desired high anti-brake dive characteristic, this is achieved in the assemblies illustrated in FIGS. 3a, 3b and 3d with a degree of compromise on the wheel trajectory angle.

FIG. 11 shows an alternative front wheel suspension assembly which may be used in a suspension system in accordance with the present invention. A front fork assembly 70 is connected to the handlebars 72, by means of an upper wishbone 74 and to the bicycle frame 14 by a lower wishbone 76.

The upper wishbone 74 is connected to the handlebars 72 by pivot 80 which permits pivotal movement about an axis parallel to the axis of rotation of the front wheel 84. The wishbone 74 is connected to the upper end of the fork assembly 70 by universal joint 82. The axis of universal joint 82 is coaxial with the axis of the fork assembly 70, to allow angular displacement between the fork assembly 70 and upper wishbone 74 other than along the axis of the fork assembly 70, so that steering movements of the handlebars 72 will be transmitted by the fork assembly 70, to the front wheel 84.

Alternatively the universal joint 82 may be replaced by a pivot which allows pivotal movement about an axis parallel to the axis of rotation of the wheel, while permitting a small amount of angular compliance in the plane at right angles to the axis of the fork assembly 70. The lower wishbone 76 is connected to the frame 14 by pivot the axis of which is normal to the plane of the frame 14; and to the fork assembly by a spherical joint 88, which will permit steering of the fork assembly 70 as well as upward and downward pivoting of the wishbone 76.

A brake reaction lever 90, is provided on the wheel hub 34, in similar manner to that described above, with reference to FIG. 6. A brake reaction link 92 is connected to the brake reaction lever 90 by pivot 94 and to the upper wishbone 74 by pivot 96, so that joint 82 is located intermediate of pivots 80 and 96. Pivots 94 and 96 permit pivotal motion about axes parallel to the axes of rotation of the front wheel 84.

With this front suspension assembly, when the brakes are applied, the brake torque is reacted by the brake reaction link 92. The brake reaction link 92 will be in tension, transmitting a downward force to the upper wishbone, at pivot 96. This will result in an upward force being applied by the upper wishbone 74, to the front end of frame 14 at pivot 80, through the handlebars 72 and steering tube 98. The magnitude of this force will depend on the relative lengths of the upper wishbone 74 and brake reaction lever 90 and the location of universal joint 82 along the upper wishbone 74. By such means the front suspension may be tuned to provide sufficient anti-dive, independent of wheel trajectory angle. The wheel trajectory angle for this assembly will be upwards and rearwards, as desired.

A further advantage of this specific arrangement is that the loads in the brake reaction link 92 will always be tensile so long as the brakes are applied whilst travelling in the forwards direction. Although the brakes may be required to operate in reverse to small degree, e.g. stopping the bicycle from rolling backwards on a hill, the forces will be small. The brake reaction link 92 can therefore be made from narrow gauge material.

With conventional front suspension assemblies including telescopic (sliding) forks, the vertical contact patch reaction will impose a side on the piston and seal, causing stiction. The front suspension assembly illustrated in FIG. 11 should overcome this problem.

The front and rear suspension assemblies disclosed above, with reference to FIGS. 4 to 11, may be used to advantage on their own or in combination, to provide independent suspension of the front and/or rear wheel of a bicycle, motor cycle or similar vehicle.

However, in accordance with preferred embodiments of the present invention, the front and rear suspension assemblies are interconnected, so that the front and rear suspensions have lower stiffness in anti-phase motion, than would a vehicle with independent front and rear suspensions, of a given stiffness in in-phase motion.

FIG. 12 shows an interconnected suspension system, in which the front suspension assembly is as disclosed with reference to FIG. 11 and the rear suspension assembly is based on the double chain suspension assembly illustrated in FIG. 9. The idler wheel 44" of the rear suspension is however mounted on the trailing arm 42 and a tensioner mechanism 48', similar to that of the Derailleur gear mechanism is provided to maintain the tension in chain 18', as the trailing arm 42 moves upwards and downwards.

The trailing arm 42 is pivotally attached to a bracket 100 on the rear tube of frame 14, so that the axis of pivot 46 passes through the point of contact of the chain 18' with idler sprocket wheel 44", on the tension side. The trailing arm 42 has an extension 102 which extends forwardly of the pivot 46. The extension 102 is connected forwardly of the pivot 46, to a balance beam 104, by means of a link 106, the link being pivotally connected at opposite ends to the extension 102 of the trailing arm 42 and to the balance beam 104. A series of longitudinally spaced apertures 108 is provided for connecting the link 106 to extension 102.

The forward end of balance beam 104 is pivotally connected to an extension 110 of the lower trailing arm 76 of the front suspension, at a position spaced rearwards from the pivot 86.

The balance beam 104 is connected to the frame 14 by means of a pair of spring/damper units 112,114. The spring/damper units 112,114 are pivotally connected to a bracket 116. Spring/damper unit 112 is connected to balance beam 104 forwardly of spring/damper unit 114, each by means of one of a series of apertures 118, spaced longitudinally of the balance beam 104.

With the suspension system described above, when the front and rear suspension assemblies act in phase, for example due to sinkage, both spring/damper units 112,114 will act together to oppose downward movement of the suspension. However, when acting out of phase, one spring/damper unit 112,114 will be compressed, while the other spring/damper unit 114,112 will extend thereby producing a lower stiffness in pitch. For example if an upward force is applied to the front forks 70, upward pivoting of trailing arm 76 will cause to forward end of balance beam 102 to be depressed, depressing the spring/damper unit 112. Pivoting of the balance beam 102 about the connection thereof to spring/damper unit 112 will cause the trailing end of balance beam 102 to move upwardly, this motion being assisted by a reduction in the compressive force applied to spring/damper unit 114. Upward movement of the rear end of the balance beam 102 is transmitted by link 104 to the trailing arm 42 of the rear suspension, causing the trailing arm 42 to move downwards.

In similar manner, upward movement of trailing arm 42 will be transmitted to lower wishbone 74, causing the front suspension to move downwards, spring/damper unit 114 being compressed and spring/damper unit 112 extending.

The above described suspension system may be tuned by suitable selection of the spring rates of the spring/damper unit 112,114 and also by altering the apertures 108, 118 by which link 106 is connected to extension 102 and/or spring/damper units 112,114 are connected to the balance beam 104.

The embodiment of the invention illustrated in FIG. 13 has a front suspension assembly as disclosed in FIG. 11 and a rear suspension assembly is based on that disclosed in FIG. 5. The front and rear suspension assemblies are interconnected by a balance beam assembly, substantially as described with reference to FIG. 12, in order to provide the required stiffness for in-phase motion, while providing relatively low stiffness for anti-phase motion.

The embodiment illustrated in FIG. 14 has a front suspension based on that illustrated in FIG. 3c. The front forks 70 are formed by an upper part 130 which is telescopically mounted in a lower part 132. A brake reaction lever 136 is provided on the hub 34 of the front wheel 84 in, for example, similar manner to that described with reference to FIG. 6. A brake reaction link 134 is connected at its lower end to the brake reaction lever 136 by pivot 138 and at its upper end to the upper part 130 of forks 70 by pivot 139.

The rear suspension assembly is based on the suspension assembly described with reference to FIG. 5. The trailing arm 42 is connected to the front tube of the frame 14 by pivot 16. A balance beam 144 is connected at its front end to a bracket 142 attached to the upper end of the lower part 132 of forks 70, by means of a spherical joint 140. A link 146 is connected at its upper end to the trailing end of balance beam 144 by pivot 148 and to the trailing arm 42, at a point intermediate of the pivot 16 and rear hub 34, by pivot 149. A pair of spring/damper units 112,114 act between the balance beam 144 and top tube of the frame 14, the spring/damper units 112,114 being connected to the balance beam 144 at longitudinally spaced locations.

In similar manner to the embodiments illustrated in FIGS. 12 and 13, when the front and rear suspension assemblies act in-phase, the spring/damper units 112,114 will both be compressed, providing high stiffness. However, for anti-phase motion, one spring/damper unit 112,114 will act in compression while the other spring/damper unit 114,112 will extend, thereby giving a relatively low stiffness.

As with the embodiments illustrated in FIGS. 12 and 13, the positions at which the link 146 is attached to the trailing arm 42 and the spring/damper units 112,114 are attached to the balance beam 144, may be adjustable, in order to permit tuning of the suspension system.

The embodiment illustrated in FIG. 15 has a front suspension assembly as illustrated in FIG. 11 and a rear suspension assembly similar to that of FIG. 14. The lower wishbone 76 of the front suspension forms a bell crank lever and is connected by pivot 152 at a position above the line joining the transverse axis of pivots 86 and 88, to one end of a spring/damper unit 150. The other end of the spring/damper unit 150 is connected to a balance lever 154 by pivot 158, the balance lever 154 being attached to the front tube of the frame 14 by pivot 156. A second spring/damper unit 160 is attached by pivot 158 to the balance lever 154 and by pivot 162, to the trailing arm 42 at a position spaced above the line joining the axis of pivot 16 with the axis of the rear hub 34.

A third spring/damper unit 164 is connected by pivot 166 to the end of the balance lever 154 remote from pivot 156 and to the rear tube of the frame 14 by pivot 168. The third spring/damper unit 164 acts in both directions, having a central balanced position in which it does not apply a load to the balance lever 154 but when displaced to one side or the other will apply a restoring force to the balance lever 154, towards the balance position. The balance position corresponds to the desired pitch attitude of the bicycle.

With this system, for in-phase motion, both spring/damper units 150,160 will be under compression and as they are interconnected will be depressed to the same degree. The balance position of balance lever 154 will be maintained by spring/damper unit 164. For anti-phase motion, the spring/damper units 150,160 will act as a solid link so that, for example, upward movement of the front suspension will cause the balance arm 154 to rotate anticlockwise compressing spring/damper unit 164 in one direction and causing the rear suspension to move downwards and vice versa. The spring/damper unit 164 may consequently provide a suspension of relatively low stiffness in pitch.

As with previous embodiments the system may be tuned by variation of the positions of pivots 152, 158, 162 and 166 as well as appropriate selection of the spring rates of spring/damper units 150, 160, 164.

The embodiment illustrated in FIG. 16 has a front suspension assembly as described with reference to FIG. 11 and a rear suspension assembly substantially as shown in FIG. 12.

A first plunger 172 is connected to the lower wishbone 76 of the front suspension assembly by pivot 170, at a position spaced downwards from the line joining the transverse axis of pivots 86,88. A second plunger 186 is connected to the trailing arm 42 by pivot 184, at a position spaced downwards from the line joining the transverse axis of pivot 46 and the rear hub. A cage 174 is slidably mounted on the plungers 172, 186, adjacent the free ends thereof. Head formations 182, 192 on provided on the free ends of plungers 172, 186 respectively. The lengths of plungers 172, 186 are such that the flange formations 182, 192 will remain separated when both the front and rear suspension assemblies are at their full extent of downward movement.

A first compression spring 176 is mounted about plunger 172 and acts between the forward end of cage 174 and a lug 178 mounted on the front tube of the frame 14. A second compression spring 188 is mounted about the second plunger 186 and acts between the rear tube of the frame 14 and the trailing end of the cage 174. The springs 176 and 188 are pre-compressed and urge the cage to a predetermined balance position, corresponding to the desired pitch attitude, throughout the permitted movement of the front and rear suspension assemblies.

Third and forth compression springs 180, 190 are mounted about plungers 172,186 and act between the inner ends of cage 174 and the head formations 182, 192 respectively.

For in-phase motion the springs 180, 190 will both be in compression, the cage 174 being maintained in its balance position by springs 176, 188. The stiffness of the suspension will consequently be relatively high. For anti-phase motion, for example if the front forks move upwardly, pivoting of the lower wishbone 76 will pull the plunger 172 forwards, compressing spring 180. This will cause the cage to move forwards compressing spring 176. Movement of the cage 174 will pull plunger 186 forwards pivoting the trailing arm downwards, until the compression in spring 190 is equal again to that in spring 180. Similarly on upward movement of the rear suspension, spring 190 will be compressed moving the cage rearwards, compressing spring 188 and causing the front suspension assembly to move downwards. The stiffness of the suspension in pitch will consequently depend on the stiffness of springs 176 and 188.

With suspension systems in accordance with the present invention, it is possible to utilise the interconnection of the front and rear suspension assemblies to control the pitch attitude set-up of the bicycle. For example while riding on the flat, a rider may require the front and rear suspensions to be set to provide a level riding position. However when riding up hill the rider may prefer the front suspension assembly to be raised and the rear suspension assembly lowered, so as to preserve a more or less horizontal riding position. Similarly the front suspension assembly may be lowered and rear suspension assembly raised when riding down hill. Alternatively pitch attitude control may be used to adjust the riders position to provide for example a streamlined head down position or a more comfortable upright position. Pitch attitude control may also be of advantage to compensate of uneven loading of the bicycle.

FIGS. 17 to 19 illustrate diagramatically a bicycle in accordance with the present invention, with pitch attitude control. In the embodiment illustrated in FIGS. 17 to 19 has a front suspension assembly of the type illustrated in FIG. 12 and a rear suspension assembly of the type illustrated in FIG. 7, A link 202 pivotally connects the lower part 132 of the telescopic forks 70 of the front suspension assembly, to a front wishbone 200 pivotally mounted on the frame 14. The front wishbone 200 is connected to the trailing arm 42 of the rear suspension assembly by a balance lever 204 similar to that described with reference to FIG. 15. The spring/damper unit 164 is however connected to the frame 14 by means of a pitch attitude control lever 206. In this manner, position of the spring/damper unit 164 may be moved, to adjust the balance position of the balance lever and thus the pitch attitude. For example, as illustrated in FIG. 17, with the balance control lever 204 in a central position, the front and rear suspension assemblies will be level, giving a normal pitch attitude. As illustrated in FIG. 18, movement of the pitch attitude control lever 204 forwards, will move the spring/damper unit 164 rearwards, moving the balance position rearwards, so that the front suspension assembly is lowered, while the rear suspension assembly is raised. Similarly movement of the pitch attitude control lever 204 rearwards will cause the front suspension assembly to be raised, while the rear suspension assembly is lowered, as illustrated in FIG. 19.

FIG. 20 shows pitch attitude control lever, suitable for use with the balance beam assemblies illustrated in FIGS. 12 and 13. In accordance with this embodiment of the invention, the spring/damper units 112,114 are attached to the front tube of the frame 14, by means of a cradle 230. The cradle 230 is non-rotatably mounted on a shaft 232, the shaft 232 being rotatably mounted between brackets 234 secured to the front tube of frame 14. A lever 236 is secured to the shaft 232, so that it extends radially therefrom, whereby the shaft 232 and cradle attached thereto may be rotated. The lever 236 is pivotally attached to the shaft 232, for movement in an axial plane of the shaft 232. Biasing means (not shown) is provided for biasing the lever 236 towards the 234 on the adjacent side of the cradle 230 and detents 238 are provided on the bracket 234, for engagement of the lever 236 at different angular positions.

By this means, the lever 236 may be disengaged from a detent 238 and rotated to rotate the cradle 230, thereby altering the orientation of the connections with the spring/damper units 112,114, which in turn will alter the orientation of the balance beam 104. Movement of the balance beam 104 in this manner, will cause the front suspension assembly to be raised, while the rear suspension assembly is lowered, or vice versa. The lever 236 may then be re-engaged with the appropriate detent 238 to lock the suspension in that pitch attitude.

In the modified pitch attitude control lever illustrated in FIGS. 21 and 22, the cradle 230 is mounted on the shaft 232, by means of a block 240, the block 240 being non-rotatably secured to the shaft 232. The block 240 engages in rectangular apertures 242, in side walls 244 of the cradle 230. The apertures 242 have a width equal the to width of the block 240, the height of the apertures is however greater than the height of the block 240, so that the block will slidingly engage and be guided by the sides of the apertures 242, while the block may move longitudinally of the apertures 242. A screw adjuster 246 is provided between an upper wall 248 of the cradle 230 and the block 240, by which the longitudinal position of the block 240 in the apertures 242 may be adjusted.

In this modification, the control lever 236 is hollow and a locking rod 250 extends through the bore of the lever 236. The locking rod 250 may be moved axially of the control lever 236, by means of a cam lever 252 mounted at the top of control lever 236, to engage one of a number of angularly spaced detents formed in an arcuate plate 254 which underlies the portion of the shaft 232 to which the control lever is attached.

In addition to altering the pitch attitude, by rotation of the control lever 236, this modified control mechanism permits adjustment of the height of the suspension. For example, if the cradle 230 is moved downwards relative to the block 240, by means if the screw adjuster 246, the resulting lowering of the balance beam 104 will cause the lower wishbone 76 of the front suspension assembly and the trailing arm 42 or the rear suspension assembly to be raised, thereby lowering the suspension. Similarly, the suspension will be raised by moving the cradle 230 upwards relative to the block 240.

Various modifications may be made without departing from the invention. For example, while in the above embodiments the spring/damper units have been positioned in the linkage between the front and rear suspension assemblies, springs or spring/damper units may alternatively or additionally be included as part of the front and rear suspension assemblies.

While in the suspension systems described above the front and rear suspension assemblies are interconnected by mechanical linkages, they may alternatively be interconnected by hydrolastic or oleopneumatic means.

The invention claimed is:

1. A suspension system for a vehicle with a chain driven rear wheel comprises:
   i) a rear suspension assembly and chain driven transmission arrangement that offers anti-brake lift and anti-squat and does so consistently through a large range of rear suspension travel;
   ii) a front suspension assembly/steering system with a steering axis inclined in the side view at an angle of castor which intersects the ground in front of a center of a contact patch, the front suspension assembly having anti-brake dive; wherein:
   iii) the front and rear suspension assemblies are interconnected in such a way as to offer low resistance to an anti-phase motion and higher resistance to an in-phase motion.

2. The suspension system according to claim 1, wherein the rear suspension assembly comprises a trailing arm (12, 42, 60, 62, 68), a rear wheel (10) being mounted to the trailing arm (12, 42, 60, 62, 68) at the rearward end thereof by a hub (34), the trailing arm (12, 42, 60, 62, 68) being attached to a frame (14) of the vehicle by a pivot (16, 46, 66,72), such that a tension side of a chain (18) of the chain transmission under tension, intersects a line interconnecting a center of the wheel (10) and an axis of the pivot (16, 46, 66. 72), at a point (24) intermediate of the center of the wheel (10) and axis of the pivot (16.46, 66, 72).

3. The suspension system according to claim 2, wherein the chain tensioning means (22) is provided to accommodate coupling between the rear suspension assembly and chain transmission.

4. The suspension system according to claim 2, wherein the rear wheel (10) has a hub mounted brake (40), a brake reaction lever (32) being attached to the hub (34), so that the hub (34) may rotate relative to the brake reaction lever (32) as long as the brake (40)is not applied, a brake reaction link (30) connecting the brake reaction lever (32) to a point (36) on a vehicle frame (14), at a level above the axis of the pivot (16) between the trailing arm (12) and frame (14).

5. The suspension system according to claim 2, wherein the rear suspension and chain transmission are substantially de-coupled throughout the full range of suspension travel.

6. The suspension system according to claim 5, wherein a drive sprocket wheel (20) mounted on the frame is connected to a driven sprocket wheel (50) on the wheel (10), via an idler sprocket wheel (44,44', 44"), the idler sprocket wheel (44, 44', 44") being positioned such that the length of chain (18) under tension between the drive sprocket wheel (20) and idler sprocket wheel (44, 44', 44") and, between the idler sprocket wheel (44. 44', 44") and driven sprocket wheel (50) will remain substantially constant, throughout the full range of suspension travel.

7. The suspension system according to claim 6, wherein the idler sprocket wheel (44) Is mounted on the trailing arm (42), a point at which the length of chain (18) between the drive sprocket wheel (20) and the idler sprocket wheel (44) first contacts the idler sprocket wheel (44), coinciding with the axis of the pivot (46) between the trailing arm (42) and frame (14).

8. The suspension system according to claim 7, wherein the chain tensioning means (48) is provided in the length of chain (18) from the driven sprocket wheel (50) to the drive sprocket wheel (20).

9. The suspension system according to claim 7, wherein first and second idler sprocket wheels (44") are drivingly interconnected, the first idler sprocket Wheel (44") being drivingly connected to the drive sprocket wheel (20) by a first chain (18') and the second idler sprocket wheel (44') being drivingly connected to the driven sprocket wheel (50) by a second chain (18").

10. The suspension system according to claim 6, wherein the idler sprocket wheel (44') is mounted on the frame (14), the length of chain (18) between the idler sprocket wheel (44') and the driven sprocket wheel (50) passing through the axis of the pivot (46) between the trailing arm (42) and frame (14) through the full movement of the trailing arm (42).

11. The suspension system according to claim 6, wherein the wheel hub (34) Is mounted on a hub carrier (60), the hub carrier (60) being mounted to the frame (14) by a pair of trailing arms (62,68), the trailing arms (62,68) converging towards the frame (14), the axis of the length of chain (18) between the idler sprocket wheel (44) and the driven sprocket wheel (50) passing through a point of intersection (V) of the axes of the trailing arms (62,68).

12. The suspension system according to claim 6, wherein the chain (18, 18") between the idler sprocket wheel (44,44', 44") and the driven sprocket wheel (50) has an angle to the horizontal, in side elevation of from 25 to 50 degrees.

13. The suspension system according to claim 1, wherein the front suspension assembly comprises a fork assembly (70), the fork assembly (70) being connected at its upper end to a steering assembly (72,98) by means of an upper wishbone (74) and, intermediate of its ends, to a frame (14) by a lower wishbone (76), in a manner which will allow the transmission of steering movements to the fork assembly (70); a front wheel (84) being rotatably connected to a lower end of the fork assembly (70) by means of a hub (34), the front wheel (84) having a hub mounted brake (40), a brake reaction lever (90) being attached to the hub (34), so that the hub (34) may rotate relative to the brake reaction lever (90) as long as the brake (40)is not applied, a brake reaction link (92) connecting the brake reaction lever (90) to the upper wishbone (74), a connection (82) of the fork assembly (70) to the upper wishbone (74) being intermediate of connection (80) of the upper wishbone (74) to the steering mechanism (72,98) and a connection (96) of the brake reaction link (92) to the upper wishbone (74).

14. The suspension assembly according to claim 13, wherein the fork assembly (70) is connected to the upper wishbone (74) by a pivot (82), which allows pivotal motion about an axis parallel to the axis of rotation of the wheel (84), while permitting some angular compliance in a plane at right angles to the axis of the fork assembly (70).

15. The suspension assembly according to claim 14, wherein the fork assembly (70) is connected to the lower wishbone (76) by a spherical joint (88).

16. The suspension assembly according to claim 13, wherein the fork assembly (70) is connected to the upper wishbone (74) by a universal joint (82), the axis of the universal joint (82) being coaxial with the axis of the fork assembly (70).

17. The suspension system according to claim 1, wherein the front and rear suspension assemblies are interconnected by means of a balance beam (104, 144), the balance beam (104, 144) being connected at a forward end to the front suspension assembly and at a trailing end to the rear suspension assembly, such that for in-phase motion the front and rear suspension assemblies will apply a load to the balance beam (104, 144) in the same direction and for anti-phase motion the balance beam (104, 144) will pivot about a point intermediate of the forward and trailing ends so that a load applied to the balance beam (104, 144) by one of the front and rear suspension assemblies will be transmitted to the other of the front and rear suspension assemblies, in the opposite direction.

18. The suspension system according to claim 17, wherein a pair of spring/damper units (112,114) act between the frame (14) and the balance beam (104, 144), the spring/damper units (112,114) being connected to the balance beam (104, 144) at axially spaced locations (118), whereby for in-phase motion both spring/damper units (112, 114) will be in compression, while for anti-phase motion, one spring/damper unit (112, 114) will be in compression while the other spring/damper unit (114, 112) extends, the balance beam (104, 144) pivoting about the connection (118) thereof with the spring/damper unit (112, 114) under compression.

19. The suspension system according to claim 1, wherein the front and rear suspension assemblies are interconnected by a balance lever (154), the front and rear suspension systems being connected to the balance lever (154) by first and second spring/damper units (150,160) and a third spring/damper unit (164) acting between the balance lever (154) and vehicle frame (14), the third spring/damper unit (164) biasing the balance lever (154) to a neutral balance position, the front and rear suspension assemblies being connected to the balance lever (154) such that; for in-phase motion first and second spring/damper units (150, 160) will be compressed, the balance lever (154) being retained in its neutral balance position by the third spring/damper unit (164); and for anti-phase motion the first and second spring/damper units (150, 160) act as a substantially rigid link, the balance lever (154) pivoting against the third spring/damper unit (164), so that a load applied to the balance lever (154) by one of the front and rear suspension assemblies will be transmitted to the other of the front and rear suspension assemblies, in the opposite direction.

20. The suspension system according to claim 1, wherein plungers (172, 182, 186, 192) attached to the front and rear suspension assemblies are interconnected by a cage (174), first and second spring means (180, 190) acting between heads (182, 192) of the plungers (172, 182, 186,192) and adjacent inner ends of the cage (174), and further spring means (176, 188) acting between the cage (174) and the vehicle frame (14), to bias the cage (174) to a neutral balance position, whereby; for in-phase motion the first and second spring means (180, 190) will be compressed, the cage (174) being retained in its neutral balance position by the further spring means (176, 158); and for anti-phase motion the load applied to one of the first and second spring means (180,190) by movement of the suspension assembly, causing the cage (174) to move from its balance position against the restoring force applied by the further spring means (176, 188), so that a load applied to the cage (174) by one of the front and rear suspension assemblies will be transmitted to the other of the front and rear suspension assemblies, in the opposite direction.

21. The suspension system according to claim 1, wherein means (206, 236) is provided for adjustment of the interconnection, to selectively alter the pitch attitude of the vehicle.

22. The suspension system according to claim 1, wherein means (230, 240, 246) is provided for adjustment of the interconnection to selectively alter the suspension height.

* * * * *